United States Patent
Kumarasamy et al.

(10) Patent No.: US 10,387,266 B2
(45) Date of Patent: Aug. 20, 2019

(54) APPLICATION-LEVEL LIVE SYNCHRONIZATION ACROSS COMPUTING PLATFORMS INCLUDING SYNCHRONIZING CO-RESIDENT APPLICATIONS TO DISPARATE STANDBY DESTINATIONS AND SELECTIVELY SYNCHRONIZING SOME APPLICATIONS AND NOT OTHERS

(71) Applicant: Commvault Systems, Inc., Tinton Falls, NJ (US)

(72) Inventors: Paramasivam Kumarasamy, Morganville, NJ (US); Brahmaiah Vallabhaneni, Marlboro, NJ (US); Amit Mitkar, Manalapan, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 139 days.

(21) Appl. No.: 15/369,676

(22) Filed: Dec. 5, 2016

(65) Prior Publication Data

US 2017/0185488 A1   Jun. 29, 2017

Related U.S. Application Data

(60) Provisional application No. 62/387,384, filed on Dec. 23, 2015.

(51) Int. Cl.
*G06F 11/00* (2006.01)
*G06F 11/14* (2006.01)
(Continued)

(52) U.S. Cl.
CPC ........ *G06F 11/1451* (2013.01); *G06F 9/4401* (2013.01); *G06F 11/1464* (2013.01); *G06F 11/2028* (2013.01); *G06F 11/2038* (2013.01)

(58) Field of Classification Search
CPC ............. G06F 11/1451; G06F 11/1448; G06F 11/1446; G06F 11/1456; G06F 11/2028;
(Continued)

(56) References Cited

U.S. PATENT DOCUMENTS 4,084,231 A   4/1978   Capozzi et al.
4,267,568 A   5/1981   Dechant et al.
(Continued)

FOREIGN PATENT DOCUMENTS

EP   0259912   3/1988
EP   0405926   1/1991
(Continued)

OTHER PUBLICATIONS

Arneson, "Mass Storage Archiving in Network Environments" IEEE, Oct. 31-Nov. 1998, pp. 45-50.
(Continued)

*Primary Examiner* — Philip Guyton
(74) *Attorney, Agent, or Firm* — Knobbe Martens Olson & Bear LLP

(57) ABSTRACT

An illustrative "Live Synchronization" feature creates and maintains a ready standby "synchronized application" that is available to take over as a failover solution for a "primary" application that operates in a production environment, but will do so on a different computing platform (e.g., physical server, virtual machine, container, etc.), and possibly on a differed kind of computing platform than, the primary. The illustrative system has specialized features and components for discovering and singling out each primary application and identifying and locating its disk image, e.g., VMDK file. The application is Live Synched to the standby/failover application without reference to whether and how other co-resident applications might be treated. The standby/failover destination supporting the synchronized application (Continued)

may be located anywhere, whether in the same data center as the primary or geographically remote or in a private or public cloud setting.

20 Claims, 20 Drawing Sheets

(51) Int. Cl.
*G06F 9/4401* (2018.01)
*G06F 11/20* (2006.01)

(58) Field of Classification Search
CPC ............ G06F 11/2056; G06F 11/2082; G06F 11/2064
See application file for complete search history.

(56) References Cited

U.S. PATENT DOCUMENTS

| | | | |
|---|---|---|---|
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 6,418,478 B1 | 7/2002 | Ignatius et al. | |
| 6,477,663 B1* | 11/2002 | Laranjeira | G06F 11/2038 709/201 |
| 6,542,972 B2 | 4/2003 | Ignatius et al. | |
| 6,658,436 B2 | 12/2003 | Oshinsky et al. | |
| 6,721,767 B2 | 4/2004 | De Meno et al. | |
| 6,760,723 B2 | 7/2004 | Oshinsky et al. | |
| 7,003,641 B2 | 2/2006 | Prahlad et al. | |
| 7,035,880 B1 | 4/2006 | Crescenti et al. | |
| 7,107,298 B2 | 9/2006 | Prahlad et al. | |
| 7,130,970 B2 | 10/2006 | Devassy et al. | |
| 7,162,496 B2 | 1/2007 | Amarendran et al. | |
| 7,174,433 B2 | 2/2007 | Kottomtharayil et al. | |
| 7,246,207 B2 | 7/2007 | Kottomtharayil et al. | |
| 7,315,923 B2 | 1/2008 | Retnamma et al. | |
| 7,343,453 B2 | 3/2008 | Prahlad et al. | |
| 7,389,311 B1 | 6/2008 | Crescenti et al. | |
| 7,395,282 B1 | 7/2008 | Crescenti et al. | |
| 7,440,982 B2 | 10/2008 | Lu et al. | |
| 7,454,569 B2 | 11/2008 | Kavuri et al. | |
| 7,490,207 B2 | 2/2009 | Amarendran et al. | |
| 7,500,053 B1 | 3/2009 | Kavuri et al. | |
| 7,529,782 B2 | 5/2009 | Prahlad et al. | |
| 7,536,291 B1 | 5/2009 | Vijayan Retnamma et al. | |
| 7,543,125 B2 | 6/2009 | Gokhale | |
| 7,546,324 B2 | 6/2009 | Prahlad et al. | |
| 7,603,386 B2 | 10/2009 | Amarendran et al. | |
| 7,606,844 B2 | 10/2009 | Kottomtharayil | |
| 7,613,749 B2* | 11/2009 | Flynn, Jr. | G06F 11/1662 |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,725,893 B2 | 5/2010 | Jaeckel et al. | |
| 7,734,669 B2 | 6/2010 | Kottomtharayil et al. | |
| 7,747,579 B2 | 6/2010 | Prahlad et al. | |
| 7,801,864 B2 | 9/2010 | Prahlad et al. | |
| 7,809,914 B2 | 10/2010 | Kottomtharayil et al. | |
| 8,078,910 B1* | 12/2011 | Backensto | G06F 11/1438 714/15 |
| 8,156,086 B2 | 4/2012 | Lu et al. | |
| 8,170,995 B2 | 5/2012 | Prahlad et al. | |
| 8,229,954 B2 | 7/2012 | Kottomtharayil et al. | |
| 8,230,195 B2 | 7/2012 | Amarendran et al. | |
| 8,285,681 B2 | 10/2012 | Prahlad et al. | |
| 8,307,177 B2 | 11/2012 | Prahlad et al. | |
| 8,364,652 B2 | 1/2013 | Vijayan et al. | |
| 8,370,542 B2 | 2/2013 | Lu et al. | |
| 8,578,120 B2 | 11/2013 | Attarde et al. | |
| 8,954,446 B2 | 2/2015 | Vijayan Retnamma et al. | |
| 9,020,900 B2 | 4/2015 | Vijayan Retnamma et al. | |
| 9,098,495 B2 | 8/2015 | Gokhale | |
| 9,146,755 B2 | 9/2015 | Lassonde et al. | |
| 9,223,597 B2 | 12/2015 | Deshpande et al. | |
| 9,239,687 B2 | 1/2016 | Vijayan et al. | |
| 9,286,110 B2 | 3/2016 | Mitkar et al. | |
| 9,292,350 B1 | 3/2016 | Pendharkar et al. | |
| 9,311,121 B2 | 4/2016 | Deshpande et al. | |
| 9,495,404 B2 | 11/2016 | Kumarasamy et al. | |
| 9,639,274 B2 | 5/2017 | Maranna et al. | |
| 9,710,465 B2 | 7/2017 | Dornemann et al. | |
| 9,740,702 B2 | 8/2017 | Pawar et al. | |
| 9,983,936 B2 | 5/2018 | Dornemann et al. | |
| 10,228,962 B2 | 3/2019 | Dornemann et al. | |
| 2004/0230899 A1 | 11/2004 | Pagnano et al. | |
| 2005/0022213 A1* | 1/2005 | Yamagami | G06F 11/1471 719/328 |
| 2005/0251785 A1* | 11/2005 | Vertes | G06F 11/2097 717/105 |
| 2006/0224846 A1 | 10/2006 | Amarendran et al. | |
| 2009/0313447 A1* | 12/2009 | Nguyen | G06F 11/1451 711/162 |
| 2009/0319534 A1 | 12/2009 | Gokhale | |
| 2012/0084769 A1 | 4/2012 | Adi et al. | |
| 2012/0144232 A1* | 6/2012 | Griffith | G06F 11/1482 714/4.12 |
| 2012/0150818 A1 | 6/2012 | Vijayan Retnamma et al. | |
| 2012/0150826 A1 | 6/2012 | Vijayan Retnamma et al. | |
| 2012/0310894 A1* | 12/2012 | Freedman | G06F 11/1402 707/674 |
| 2014/0115285 A1 | 4/2014 | Arcese et al. | |
| 2014/0196038 A1 | 7/2014 | Kottomtharayil et al. | |
| 2014/0201157 A1 | 7/2014 | Pawar et al. | |
| 2014/0201170 A1 | 7/2014 | Vijayan et al. | |
| 2015/0074536 A1 | 3/2015 | Varadharajan et al. | |
| 2016/0019317 A1 | 1/2016 | Pawar et al. | |
| 2016/0132400 A1 | 5/2016 | Pawar et al. | |
| 2016/0350391 A1 | 12/2016 | Vijayan et al. | |
| 2017/0090972 A1 | 3/2017 | Ryu et al. | |
| 2017/0168903 A1 | 6/2017 | Dornemann et al. | |
| 2017/0185488 A1 | 6/2017 | Kumarasamy et al. | |
| 2017/0193003 A1 | 7/2017 | Vijayan et al. | |
| 2017/0235647 A1 | 8/2017 | Kilaru et al. | |
| 2017/0242871 A1 | 8/2017 | Kilaru et al. | |
| 2018/0113625 A1 | 4/2018 | Sancheti et al. | |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |

(56) References Cited

FOREIGN PATENT DOCUMENTS

| EP | 0899662 | 3/1999 |
|---|---|---|
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, May 1991, New York, US, pp. 1-15.

\* cited by examiner

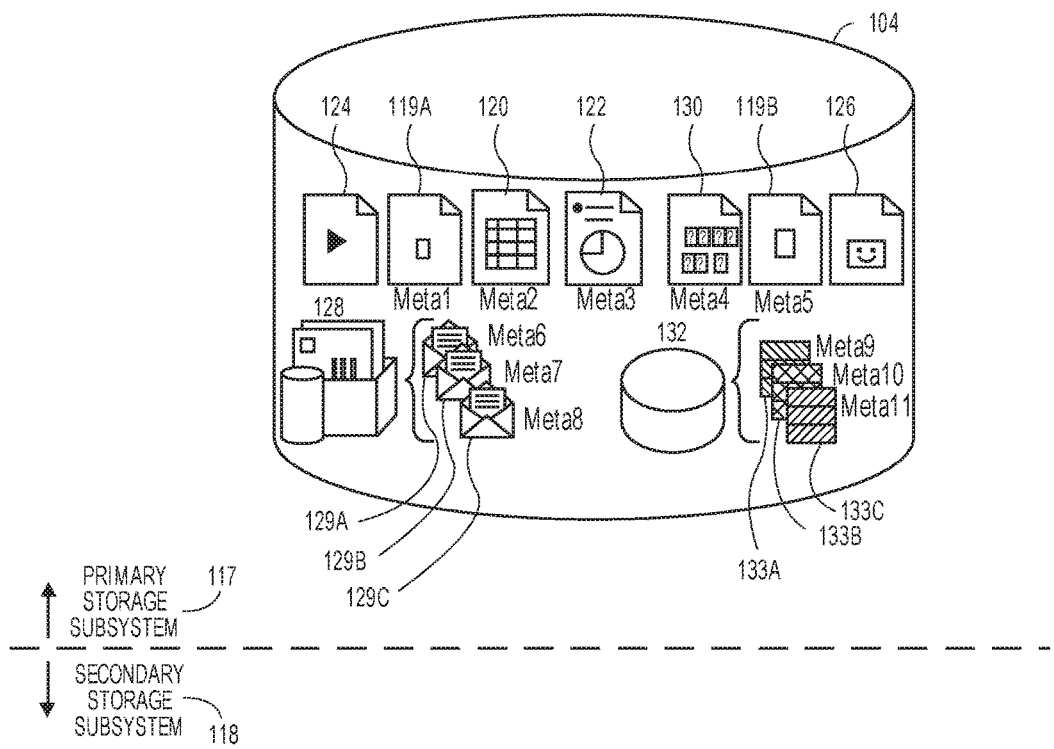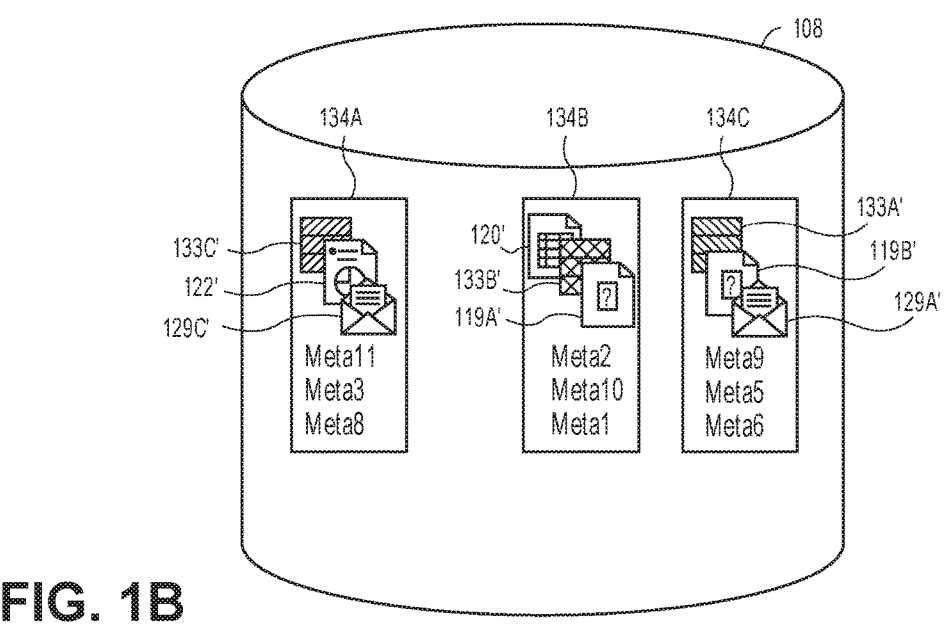
FIG. 1B

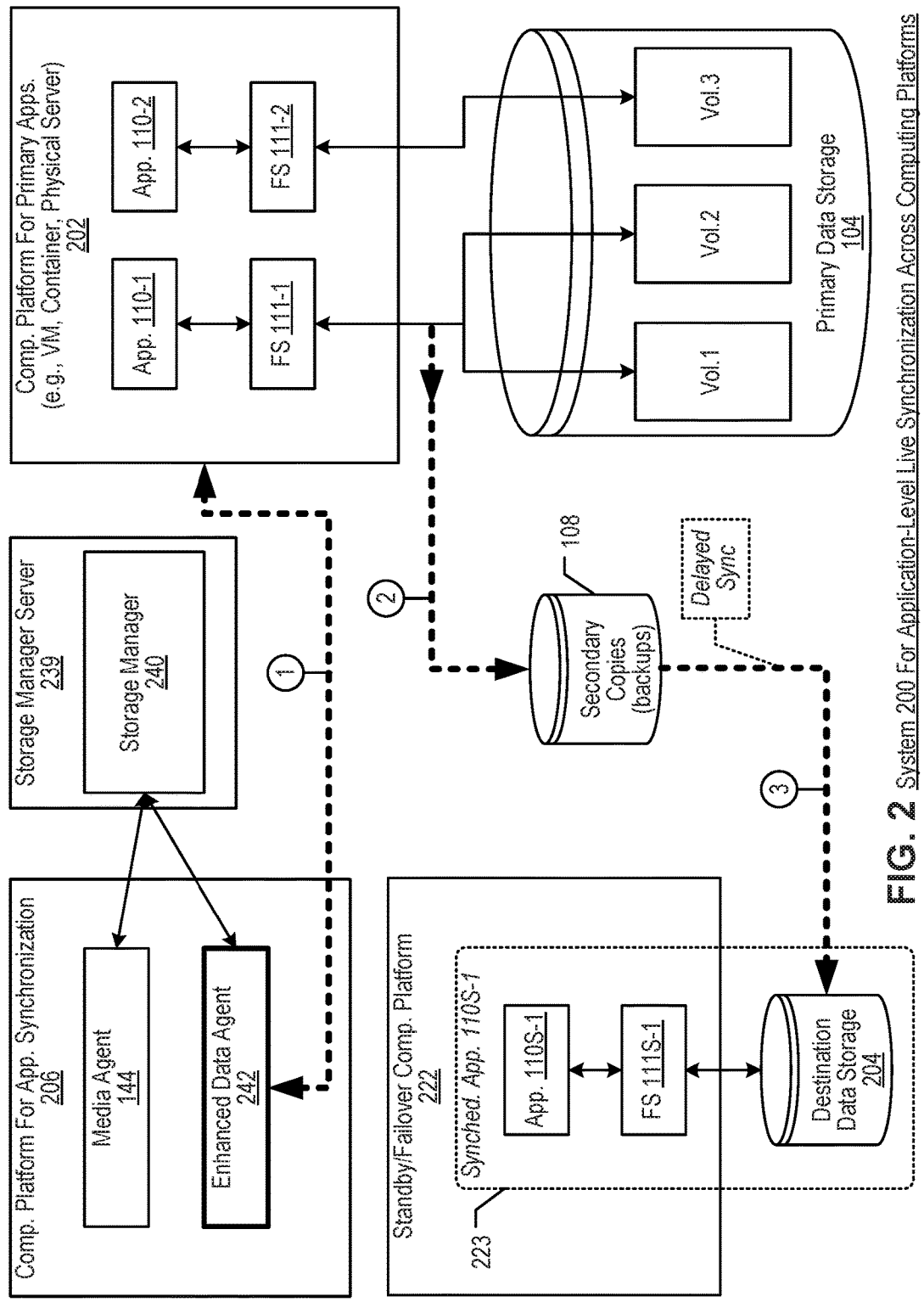
FIG. 2 System 200 For Application-Level Live Synchronization Across Computing Platforms

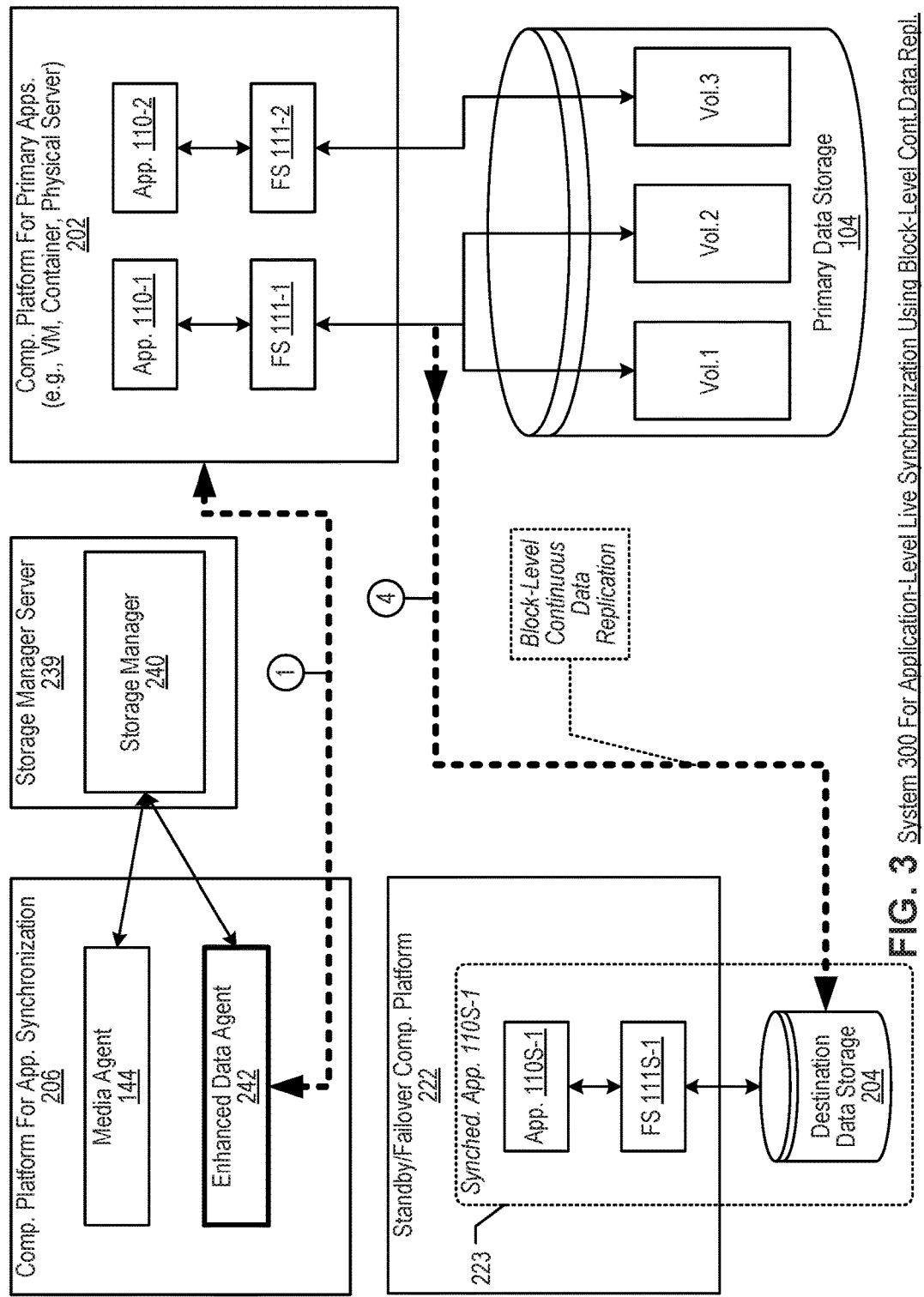
FIG. 3 System 300 For Application-Level Live Synchronization Using Block-Level Cont.Data.Repl.

Block-level Cont. Data Replication From Primary To Standby Plus Consistent Recovery Point Via Snapshot Taken At Destination

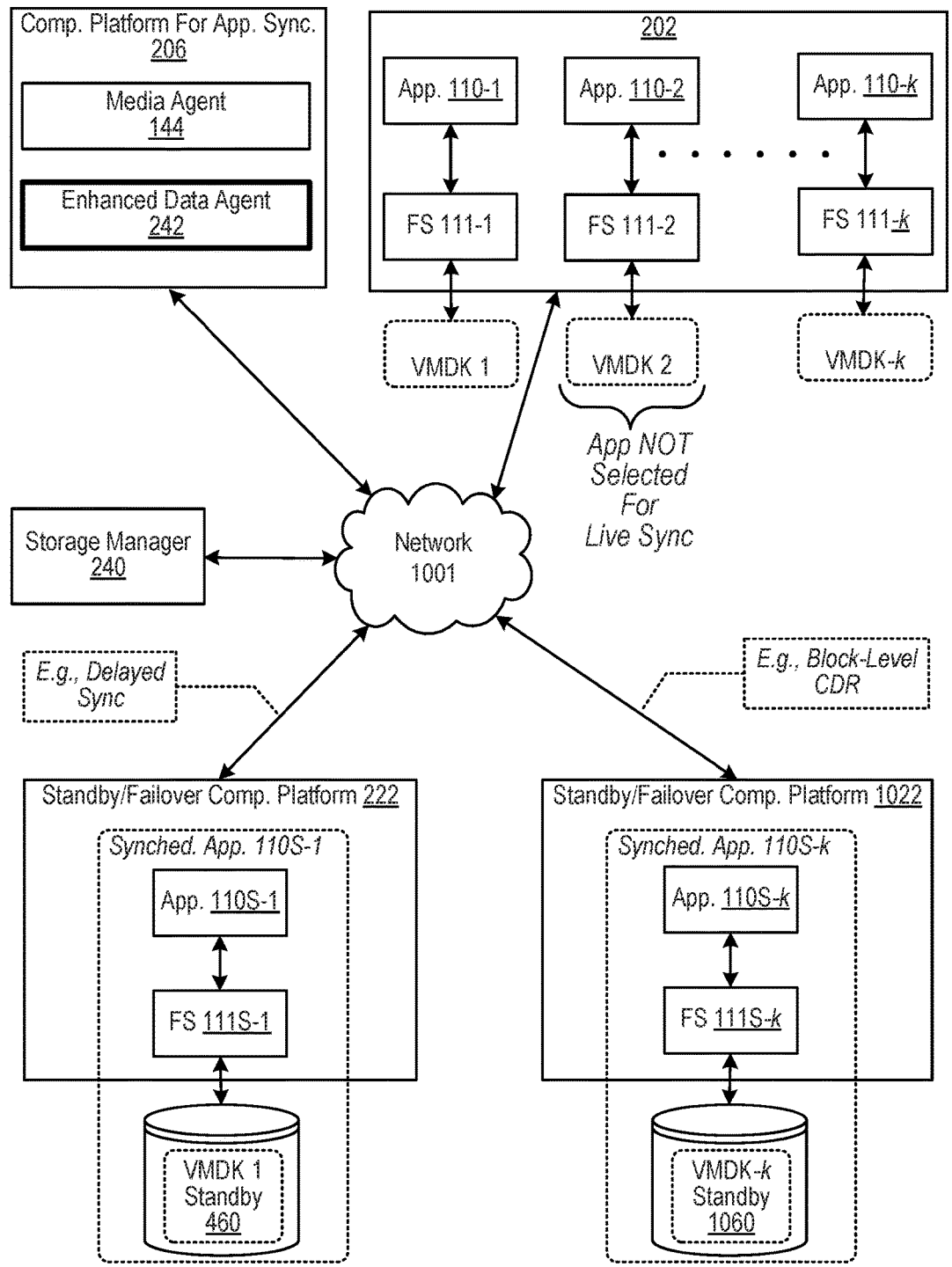
FIG. 10  Synchronizing Co-resident Applications To Disparate Standby Destinations While Selectively Synchronizing Some Applications And Not Others

APPLICATION-LEVEL LIVE SYNCHRONIZATION ACROSS COMPUTING PLATFORMS INCLUDING SYNCHRONIZING CO-RESIDENT APPLICATIONS TO DISPARATE STANDBY DESTINATIONS AND SELECTIVELY SYNCHRONIZING SOME APPLICATIONS AND NOT OTHERS

INCORPORATION BY REFERENCE TO ANY PRIORITY APPLICATIONS

This application claims priority to U.S. Provisional Patent Application No. 62/387,384, filed on Dec. 23, 2015, and entitled "Application-Level Live Synchronization across Computing Platforms Including Synchronizing Co-Resident Applications to Disparate Standby Destinations and Selectively Synchronizing Some Applications and not Others." Any and all applications, if any, for which a foreign or domestic priority claim is identified in the Application Data Sheet of the present application are hereby incorporated by reference in their entireties under 37 CFR 1.57. Also hereby incorporated by reference herein are U.S. Provisional Patent Application Ser. No. 62/265,339, filed on Dec. 9, 2015, and U.S. patent application Ser. No. 15/365,756, filed on Nov. 30, 2016, both of which have the title of "Live Synchronization and Management of Virtual Machines across Computing and Virtualization Platforms and Using Live Synchronization to Support Disaster Recovery."

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth.

SUMMARY

Traditional approaches to block-level storage management usually perform backup operations and other storage management operations at a physical disk or logical disk level or for an entire virtual machine, backing up data blocks regardless of which files or applications they are connected to. For example, an entire disk or logical volume comprising several disks may be backed up at the block-level or an entire virtual machine or container may be backed up. This block-level approach tends to yield speedier results as compared to file-level storage management. However, a need exists for taking into consideration different levels of importance that might attach to the variety of applications that operate on given computing platform, whether the platform is physical or virtualized.

Applications that are configured and/or operate in a production environment will be referred to herein as "primary" applications. According to the present invention, an illustrative "Live Synchronization" or "Live Sync" feature creates and maintains a ready standby "synchronized application" that is available on standby to take over as a failover solution for the primary application, but will do so on a different computing platform (e.g., physical server, virtual machine, container, etc.), and possibly on a different kind of computing platform than, the primary. A primary application that is targeted for Live Sync may co-reside on the same computing platform (e.g., physical server, virtual machine, container, etc.) as any number of other applications. The illustrative system has specialized features and components for discovering and singling out each primary application and identifying and locating its disk image, e.g., VMDK file. The application is Live Synched to the standby/failover application without reference to whether and how the other co-resident applications might be treated. For example, if a virtualized production environment executes three distinct applications on a virtual machine, a first primary application may be Live Synched to a first failover system (e.g., another virtual machine) for use in a disaster recovery scenario; the second primary application may be Live Synched to another disparate failover system (e.g., a physical server), likewise for use in disaster recovery. The third primary application may be considered lower priority and not subjected to Live Sync; instead, the third primary application may be backed up according to traditional methods, but is not Live Synched to a standby system, and therefore must be explicitly restored from backup before use. Thus, according to the illustrative embodiments, co-resident applications can be individually Live Synched to disparate standby destinations while some applications might not be Live Synched at all. Since the disclosed approach is able to auto-discover each primary application and its associated file system, primary data, and disk image (e.g., VMDK), each application can be treated individually in the illustrative storage management system. The application-specific Live Synchronization described may be used to support disaster recovery scenarios, wherein a failure in a primary application triggers the corresponding synchronized application to take over operations with minimal downtime. The standby/failover destination supporting the synchronized application may be located anywhere, whether in the same data center as the primary or geographically remote or in a private or public cloud setting.

Application-Level Live Synchronization. In contrast to the prior art, the illustrative systems perform application-level synchronization, individually protecting each primary application, instead of Live Synchronization of entire virtual machines which may host any number of applications. This individual treatment provides flexibility of destination type, such as synchronizing an application from a virtual machine to a physical host and vice-versa and/or from one type of host vendor/technology to another type of vendor/technology, including to/from cloud computing platforms. The individualized application-level protection also provides savings in destination standby storage space, network bandwidth, as well as improved recovery time objectives ("RTO") for targeted applications that carry high importance to the business.

Selectivity. In addition to the individualized application-level Live Synchronization that selects some but not necessarily all primary applications for Live Sync, the illustrative systems further include options for administrators to even more closely tailor operations to their needs. For example, a system administrator may select only certain source data to be synchronized relative to a certain targeted application. Filtering criteria include logical volume, hard disk, and/or folders/files. This approach improves system performance by reducing the storage footprint of backups and of the standby copy, reduces network bandwidth, and saves on processing cycles required of the various components. Moreover, certain applications may be selected out, i.e., not Live Synched at all.

Block-Level Continuous Data Replication. Block-level continuous data replication ("CDR") from primary to standby disk image without using intermediary backups and restores provides another important advantage, because it enables the illustrative system to keep the standby copy closely mirroring changes in the primary, so that little or no data is lost when a switchover from primary to standby is needed. The result is that a given application may be kept in a ready "warm" state at one or more standby/failover destinations, quite independent of how the application's co-resident applications and/or primary storage is treated in case of a failure in the primary production environment. Block-level CDR advantageously enables fast processing and sparing transmission, as well as speedy updates of the standby copy, by using capturing and manipulating only changed blocks, in contrast to more traditional file-level continuous data replication.

Smaller Footprint when One Data Agent Protects Many Applications. According to the disclosed new architecture of the illustrative embodiments, one enhanced data agent can protect a number of distinct applications on one or more computing platforms. This solution greatly reduces the footprint and installation/management effort associated with traditional data agents, each of which is individually paired with a target application and separately with its file system. Instead, according to the illustrative embodiments, a substantial number of primary applications can be protected by one enhanced data agent. In some cases, limited-footprint components are additionally installed on the primary computing platform and coupled with the targeted application/file system, but they have small footprints compared to the multiple data agents and furthermore can be automatically pushed thereto by the enhanced data agent itself as needed. In many systems the illustrative enhanced data agent may co-reside with a media agent on a secondary storage computing device, which means that the enhanced data agent does not require additional specialized computing hardware. The disclosed architecture is especially advantageous in very large data networks and data centers, where having one enhanced data agent responsible for several primary applications can save a great deal of effort in installing and maintaining enhanced data agents.

The illustrative application-level Live Sync approach can take a number of different forms, depending on need and on the nature of the primary applications targeted for Live Synchronization. A number of salient components play important roles. First, an enhanced data agent is installed on a computing platform other than the one hosting the primary applications, in contrast to traditional co-resident data agents. Second, the enhanced data agent establishes communications with the primary applications' host to discover what applications might be configured and/or operating thereon. Third, the enhanced data agent will determine whether the auto-discovered applications comprise a respective connector or application programming interface ("API") or another like utility to enable the enhanced data agent to perform one or more of the following operations: communicate with the primary application, discover/identify its operational characteristics, including locating its disk image, quiesce the primary application for backup, instruct it to perform a backup, and/or un-quiesce it afterwards. If no such utility is found, the enhanced data agent pushes a utility to the application for these purposes. In contrast to a co-resident data agent, this installed "application utility" occupies a minimal footprint on the primary host. Fourth, the enhanced data agent also will determine whether the application and/or its associated file system comprises a native utility (such as a log or journal or the like), for tracking changed data blocks being generated and written by the application. If no such utility can be found, the enhanced data agent pushes an application-specific changed block filter to be installed on the primary application's host. After a baseline full backup of the application-specific disk image, the rest of Live Sync relies on the changed block filter (whether native or installed by the enhanced data agent) to capture changed blocks for updating the standby copy of the application's disk image which is maintained at the standby/failover computing platform. Like the installed application utility, the installed changed block filter also has a minimal footprint. Fifth, the enhanced data agent is capable of supporting the Live Synchronization of a number of distinct primary applications executing on one or more computing platforms—in contrast to the traditional one-on-one pairing of a primary application with a co-resident data agent installed on the application's host.

In some embodiments, the changed data blocks from the primary applications are continuously replicated to the standby copy of the disk image. Therefore, the synchronized application closely mirrors the changes occurring at the primary application so that when it boots up from the standby disk image there is minimal, if any, loss of data relative to the primary application.

In some alternative embodiments and/or in reference to other primary applications in the illustrative system, instead of continuous data replication, the changed data blocks from the primary application are backed up as incremental backups to an intermediary secondary storage, e.g., hourly. From there, the incremental backups are synchronized to the standby copy of the disk image at the standby/failover destination. This latter step may occur immediately after the incremental backup is made or may occur on a delayed schedule, e.g., daily. If a delayed schedule is used, the incremental backups are not immediately applied to the standby disk image, and instead several incremental backups are allowed to accumulate before being applied. For example, incremental backups that occur hourly may be synchronized to the standby/failover destination daily. In such a scenario, the multiple incremental backups are analyzed and only the most current changed data blocks are transmitted from the intermediary secondary storage to the standby/failover destination. In other words, rather than "replaying" each incremental backup in turn, only the minimum set of changed blocks is applied, thereby reducing churn. The incremental backups are retained in secondary storage as point-in-time backups in case the primary application or standby application needs to revert to a certain earlier point in time, e.g., a known good state. This might be required if a test of the synchronized application reveals a boot failure or some other data corruption. In such a case, when the synchronized application is activated for taking over from the primary application, it would begin operating from a disk image from an earlier known good point in time rather than using the latest incremental backup.

The enhanced data agent comprises sub-components or functional modules in some embodiments. For example, an illustrative enhanced data agent comprises any number of application-specific connectors for communicating with the application hosts and with the discovered applications, whether communicating with the applications' respective native connector/API or with an installed application utility pushed thereto by the enhanced data agent. A given application-specific connector in the enhanced data agent queries the application for operational characteristics and identifies/locates the application's disk image, transmits quiesce commands to the application in anticipation of a backup operation, and correspondingly transmits un-quiesce commands after the backup completes. Some applications comprise self-backup functionality and the exemplary application-specific connector in the enhanced data agent can instruct the targeted application to perform a full backup which acts as a baseline for changed block tracking afterwards.

The enhanced data agent also comprises secondary copy control functionality that transmits control messages to and receives changed data blocks from the targeted application. For example, a secondary copy controller detects whether the application or associated file system comprises a native tracker for changed data blocks; if not, the secondary copy controller pushes a changed block filter thereto. Thereafter the secondary copy controller maintains communications with the native or installed changed block filter to obtain the changed blocks and/or to route the changed blocks to an assigned media agent.

In the case of incremental backups that accumulate at an intermediary secondary storage device, the secondary copy controller in the enhanced data agent performs an analysis of the multiple accumulated incremental backups and generates a "unified" or "final" version that comprises only the latest changes as to any given data block relative to the preceding restore to the standby computing platform. This unified or final version of the accumulated changed data blocks is then transmitted to the standby computing platform in the form of a restore operation that updates the standby copy of the application's disk image so that the application can be said to be synchronized. This approach advantageously reduces the bandwidth required in communicating with the destination computing platform and is also speedier, as less data block churn occurs at the standby/failover destination.

In addition to the enhancements described above, the illustrative system further comprises an enhanced storage manager that transmits queries to the enhanced data agent asking about applications in the illustrative system. In response to receiving such a query, the enhanced data agent begins the process of automatic discovery of the applications and their operational properties, such as type of application, file system configuration, primary data configuration (e.g., storage volume IDs) and disk image (e.g., VMDK). The enhanced storage manager may instruct the enhanced data agent to proceed with further discovery of whether connectors/APIs and/or changed block trackers are natively available in the discovered applications. In some alternative embodiments, the enhanced data agent performs these discovery steps autonomously without explicit instruction from the storage manager. The storage manager may further provide scheduling information to the enhanced data agent, e.g., how often to execute incremental backups and how often to synchronize the backups to the standby destination.

On receiving the discovery information about the applications from the enhanced data agent, the storage manager may analyze the nature of the discovered applications and may apply certain priorities or rules. For example, certain applications, e.g., Oracle DBMS, may be treated with highest priority for Live Synchronization, whereas other applications, e.g., Microsoft Office applications (E.g., Word, Excel, etc.) will be backed up but not Live Synched. Accordingly, the storage manager may then instruct the enhanced data on which applications are to be Live Synched and where their standby destinations are to be configured. The storage manager is still responsible for managing the illustrative storage management system as a whole, e.g., controlling storage operations and other information management operations, maintaining a management database, etc.

BRIEF DESCRIPTION OF THE DRAWINGS

FIG. 1B is a detailed view of a primary storage device, a secondary storage device, and some examples of primary data and secondary copy data.

FIG. 2 is a block diagram illustrating some salient portions of a system 200 for application-level Live Synchronization across computing platforms, according to an illustrative embodiment of the present invention that uses incremental backups and delayed synchronization.

FIG. 3 is a block diagram illustrating some salient portions of a system 300 for application-level Live Synchronization using block-level continuous data replication, according to another illustrative embodiment of the present invention.

FIG. 10 is a block diagram illustrating some salient portions of a hybrid system 200/300 for application-level Live Sync depicting Live Synchronization of co-resident applications to disparate standby destinations and further depicting selectively synchronizing some applications and not others among the co-resident applications.

DETAILED DESCRIPTION

Descriptions and examples of systems and methods according to one or more illustrative embodiments of the present invention may be found in the section entitled APPLICATION-LEVEL LIVE SYNCHRONIZATION ACROSS COMPUTING PLATFORMS INCLUDING SYNCHRONIZING CO-RESIDENT APPLICATIONS TO DISPARATE STANDBY DESTINATIONS AND SELECTIVELY SYNCHRONIZING SOME APPLICATIONS AND NOT OTHERS, as well as in the section entitled Example Embodiments, and also in FIGS. 2-10 herein. Furthermore, components and functionality for application-level Live Synchronization may be configured and/or incorporated into information management systems such as those described herein in FIGS. 1A-1H.

Various embodiments described herein are intimately tied to, enabled by, and would not exist except for, computer technology. For example, application-level Live Synchronization, including auto-discovering applications in a storage management system, communications between enhanced data agents and targeted applications, as well as application-level data block backups and replication as described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
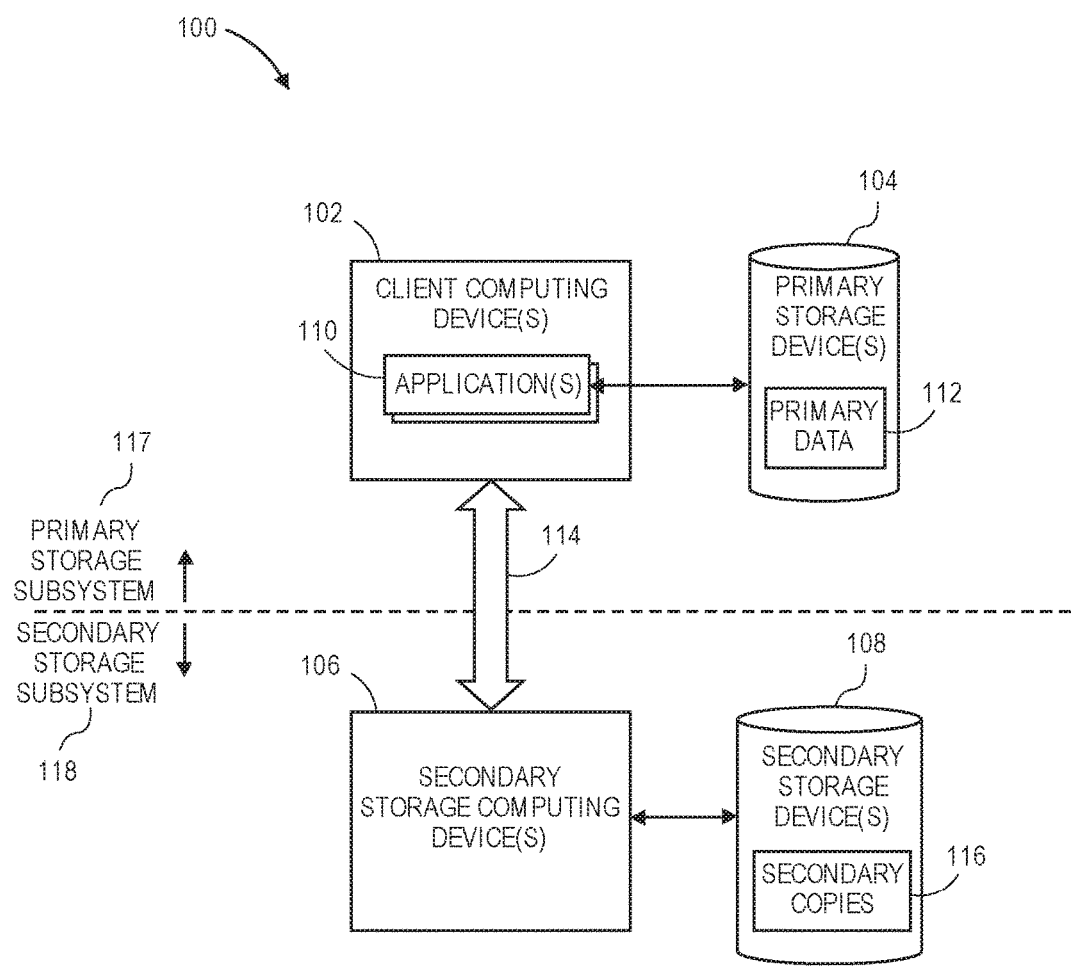
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,734,669, entitled "Managing Copies Of Data";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. No. 8,954,446, entitled "Client-Side Repository in a Networked Deduplicated Storage System";

U.S. Pat. No. 9,020,900, entitled "Distributed Deduplicated Storage System";

U.S. Pat. No. 9,098,495, entitled "Application-Aware and Remote Single Instance Data Management";

U.S. Pat. No. 9,239,687, entitled "Systems and Methods for Retaining and Using Data Block Signatures in Data Protection Operations";

U.S. Pat. No. 9,417,968, entitled "Efficiently Restoring Execution of a Backed Up Virtual Machine based on Coordination with Virtual-Machine-File-Relocation Operations";

U.S. Pat. No. 9,436,555 entitled "Efficient Live-Mount of a Backed Up Virtual Machine in a Storage Management System";

U.S. Pat. Pub. No. 2006/0224846, entitled "System and Method to Support Single Instance Storage Operations";

U.S. Pat. Pub. No. 2014/0201170, entitled "High Availability Distributed Deduplicated Storage System";

U.S. Pat. Pub. No. 2016/0085636, entitled "Efficiently Restoring Execution of a Backed Up Virtual Machine based on Coordination with Virtual-Machine-File-Relocation Operations";

U.S. patent application Ser. No. 14/721,971, entitled "Replication Using Deduplicated Secondary Copy Data";

U.S. patent application Ser. No. 14/805,615, entitled "Browse and Restore for Block-Level Backups";

U.S. patent application Ser. No. 15/365,756, entitled "Live Synchronization and Management of Virtual Machines across Computing and Virtualization Platforms and Using Live Synchronization to Support Disaster Recovery";

U.S. Patent Application No. 62/265,339, entitled "Live Synchronization and Management of Virtual Machines across Computing and Virtualization Platforms and Using Live Synchronization to Support Disaster Recovery";

U.S. Patent Application No. 62/273,286, entitled "Redundant and Robust Distributed Deduplication Data Storage System";

U.S. Patent Application No. 62/294,920, entitled "Data Protection Operations Based on Network Path Information";

U.S. Patent Application No. 62/297,057, entitled "Data Restoration Operations Based on Network Path Information";

U.S. Patent Application No. 62/305,919, filed on Mar. 9, 2016, entitled "Using Hypervisor-Independent Block-Level Live Browse to Directly Access Backed Up Virtual Machine (VM) Data and Perform Hypervisor-Free File-Level Recovery (Block-Level Pseudo-Mount)";

U.S. Patent Application No. 62/402,269, filed Oct. 17, 2016 and entitled "Heartbeat Monitoring of Virtual Machines for Initiating Failover Operations in a Data Storage Management System".

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, Calif.; Microsoft Virtual Server and Microsoft Windows Server Hyper-V, both by Microsoft Corporation of Redmond, Wash.; Sun xVM by Oracle America Inc. of Santa Clara, Calif.; and Xen by Citrix Systems, Santa Clara, Calif. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, DNA/RNA-based memory technology, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1C:
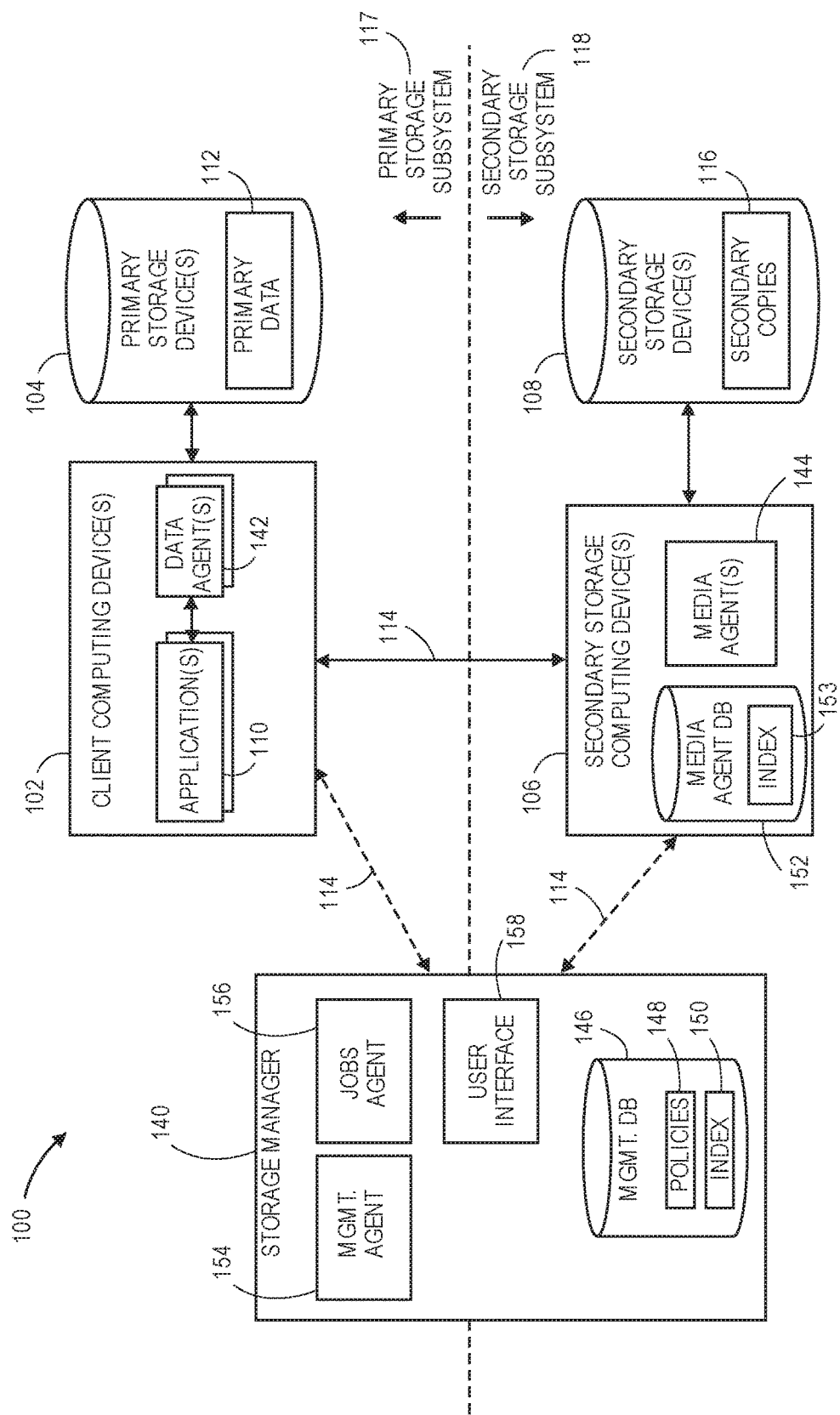
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file system, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/ or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:
  communicating with data agents 142 and media agents 144, including transmitting instructions, messages, and/or queries, as well as receiving status reports, index information, messages, and/or queries, and responding to same;
  initiating execution of information management operations;
  initiating restore and recovery operations;
  managing secondary storage devices 108 and inventory/capacity of the same;
  allocating secondary storage devices 108 for secondary copy operations;
  reporting, searching, and/or classification of data in system 100;
  monitoring completion of and status reporting related to information management operations and jobs;
  tracking movement of data within system 100;
  tracking age information relating to secondary copies 116, secondary storage devices 108, comparing the age information against retention guidelines, and initiating data pruning when appropriate;
  tracking logical associations between components in system 100;
  protecting metadata associated with system 100, e.g., in management database 146;
  implementing job management, schedule management, event management, alert management, reporting, job history maintenance, user security management, disaster recovery management, and/or user interfacing for system administrators and/or end users of system 100;
  sending, searching, and/or viewing of log files; and
  implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents.

Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
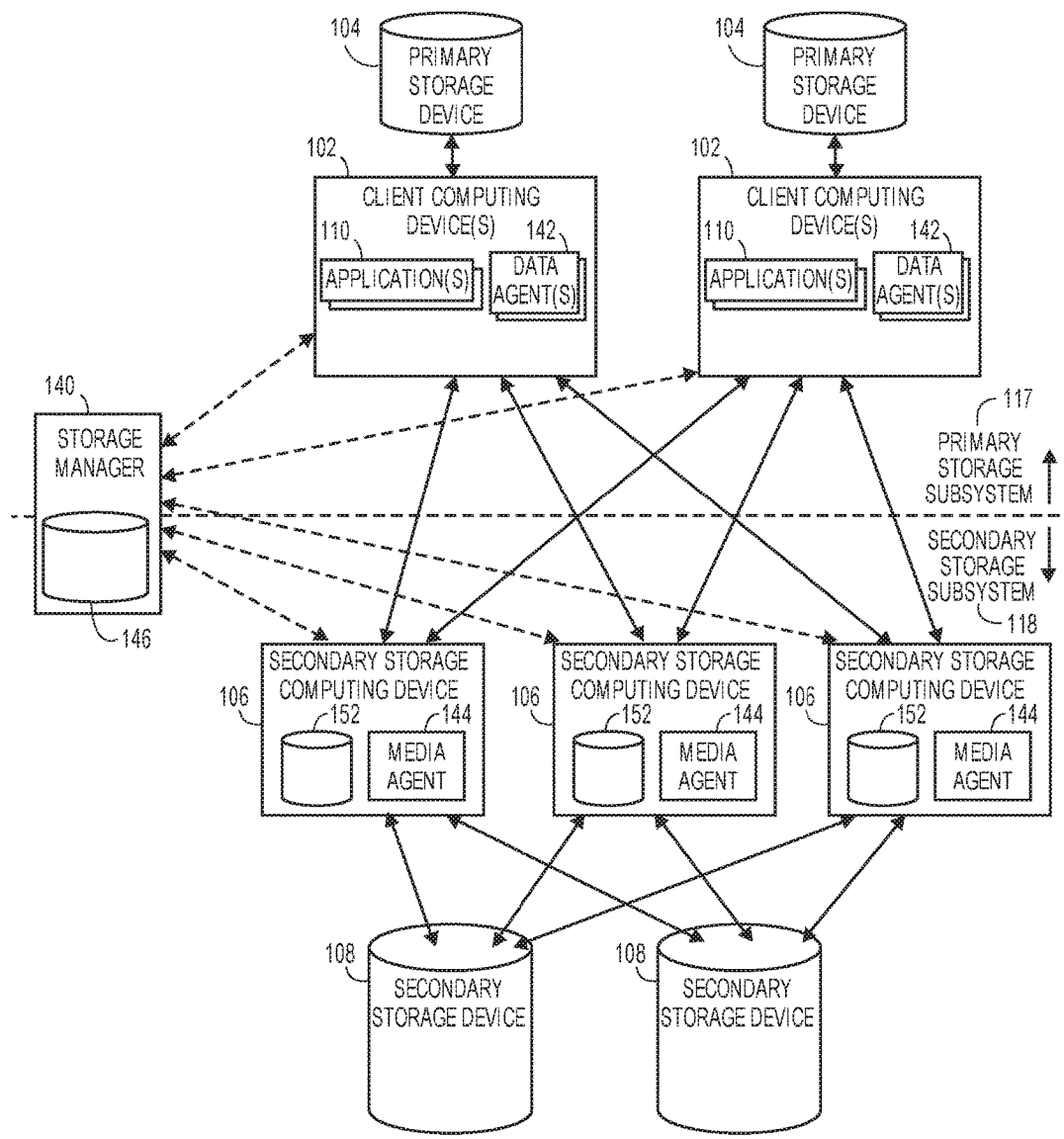
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "on-line archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

schedules or other timing information, e.g., specifying when and/or how often to perform information management operations;

the type of secondary copy 116 and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality, importance) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Copy Operations

Figure 1E:
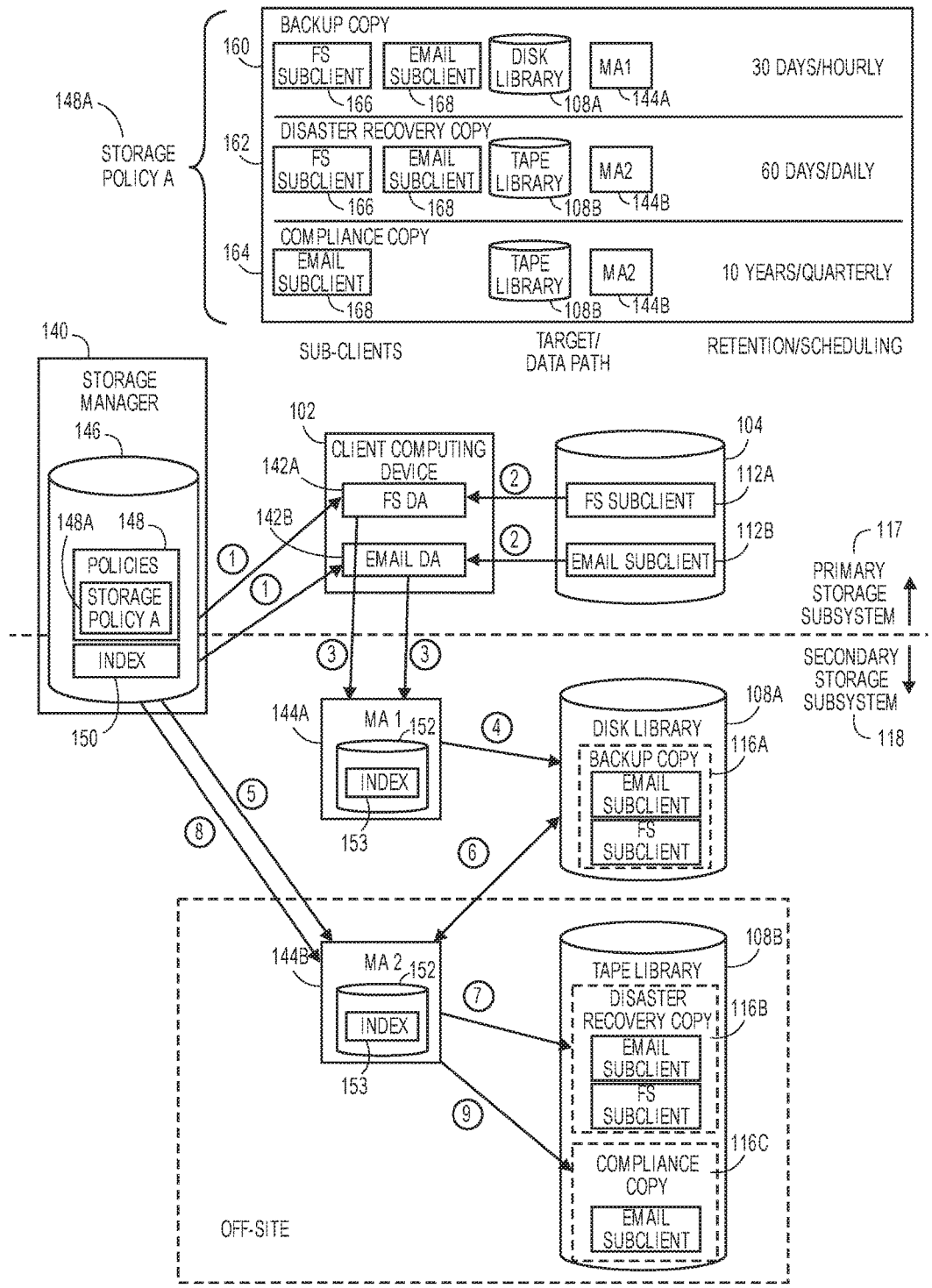
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
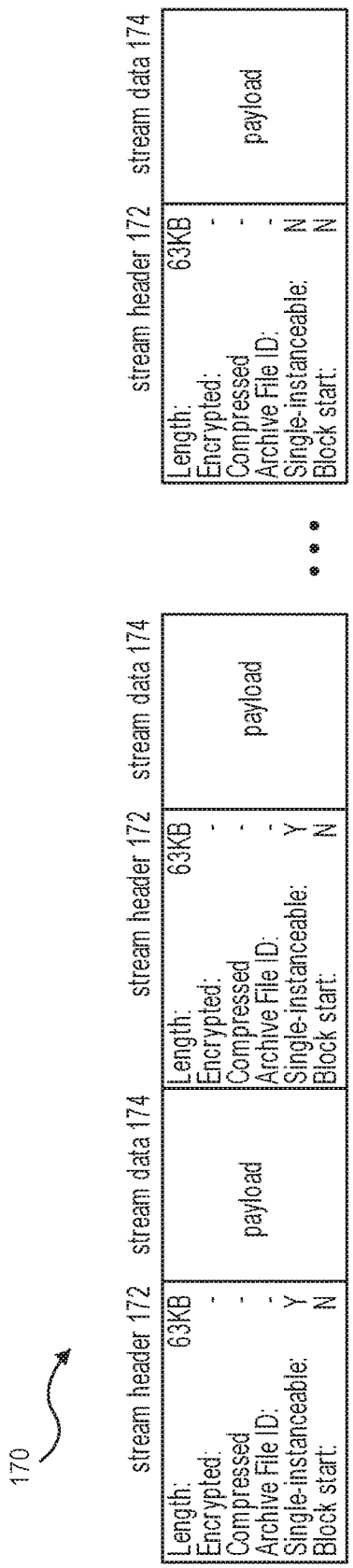
FIGS. 1F-1H are block diagrams illustrating suitable data structures that may be employed by the information management system.
Figure 1G:
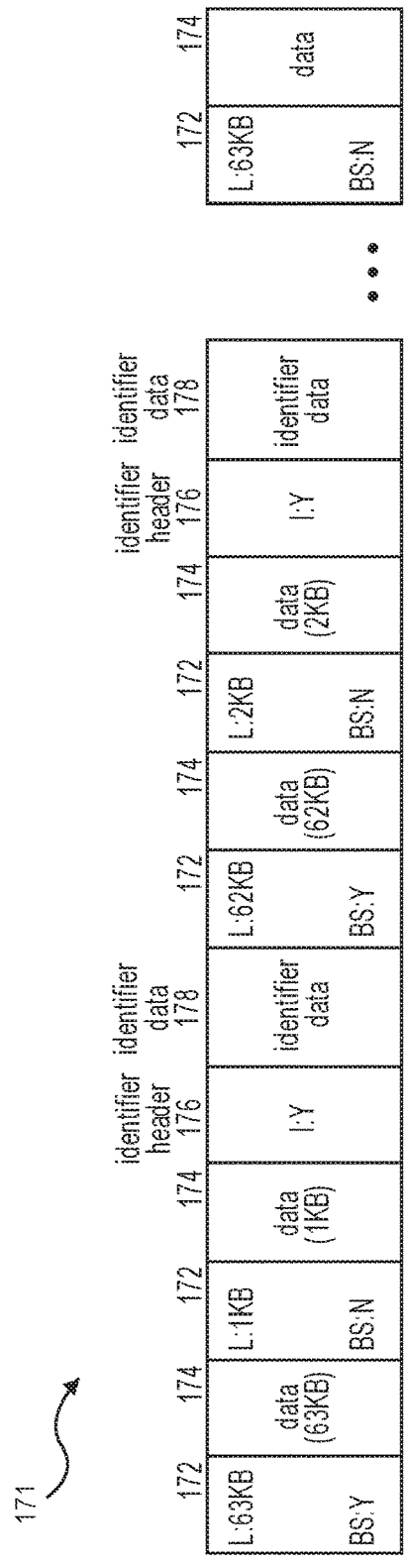

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
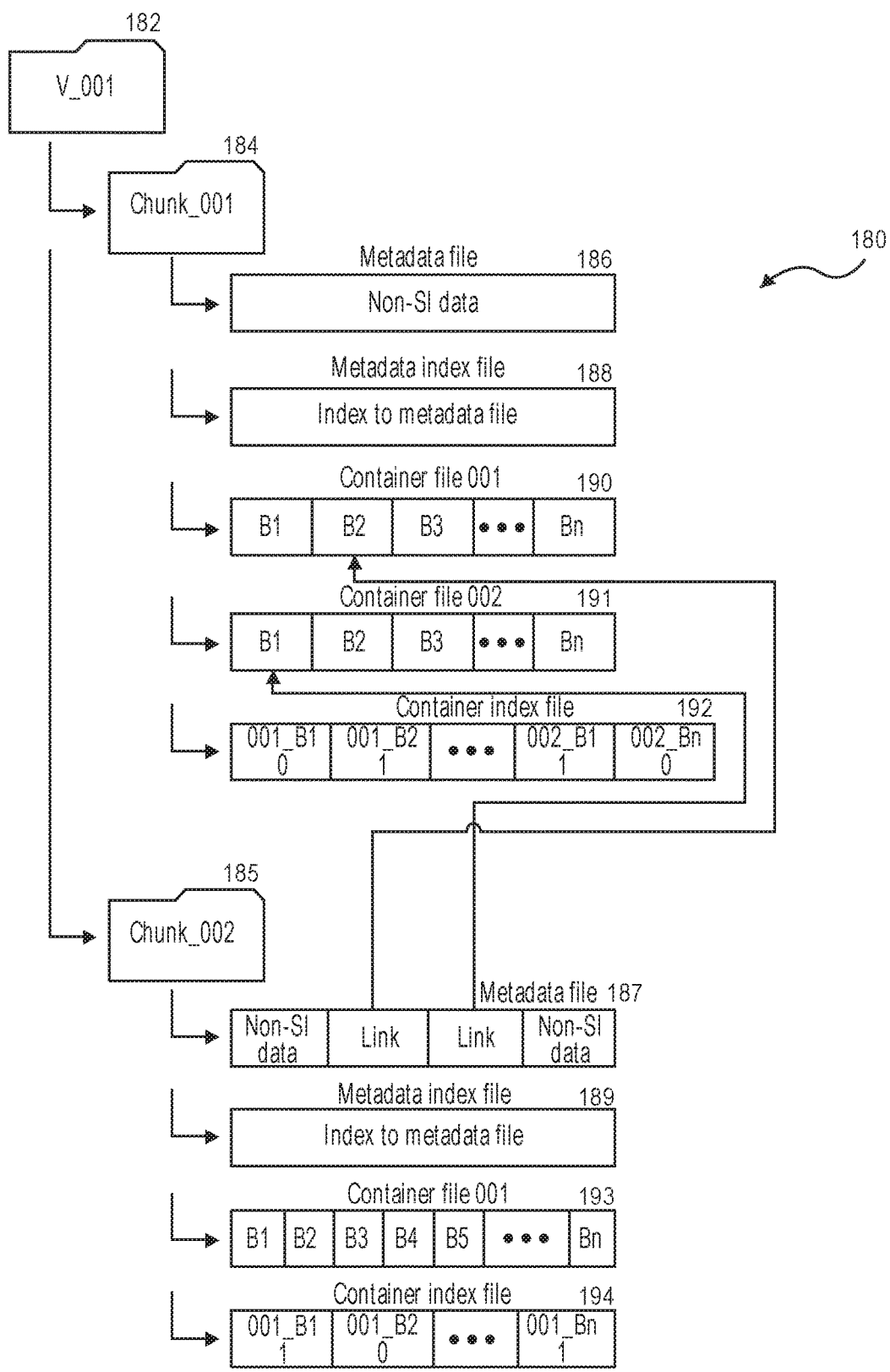

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Application-Level Live Synchronization Across Computing Platforms Including Synchronizing Co-Resident Applications to Disparate Standby Destinations and Selectively Synchronizing Some Applications and not Others FIG. 2 is a block diagram illustrating some salient portions of a system 200 for application-level Live Synchronization across computing platforms, according to an illustrative embodiment of the present invention. The illustrative system 200 employs delayed synchronization as between an intermediary storage 108 that stores incremental backups and the destination data storage 204 that comprises the standby disk image of the targeted application. As shown here, application 110-1 and its associated file system 111-1 and associated primary data stored in volume 1 and volume 2 are synchronized to standby/failover computing platform 222, resulting in a so-called "synchronized application 110S-1" that acts as a standby for primary application 110-1. On a failure of application 110-1 or its file system 111-1 or its associated primary data storage 104, synchronized application 110S-1 can take over on computing platform 222. Synchronized application 110S-1 becomes the primary until such time as control is restored to application 110-1. The configuration shown in the present figure uses incremental block-level backups to an intermediary secondary storage device followed by restore operations to the standby/failover destination. This process can delay how soon the standby/failover destination is updated. Therefore, an alternative configuration shown in FIG. 3 uses block-level continuous data replication to maintain a flow of changing blocks captured at the source and replicated to the standby copy at the standby/failover destination.

Computing platform 202 hosts one or more applications 110 operating in the production environment, which may be referred to as "primary applications 110." Primary data for the primary applications 110 is stored in an associated primary data storage device 104. Computing platform 202 may be a physical computing device (e.g., server, laptop, etc.) or may be embodied as a virtual machine or container operating in a virtualized production environment, whether it is a private cloud or a public cloud. Computing platform 202 provides computing power that hosts primary applications 110. In contrast to client computing device 102, computing platform 202 does not have installed data agents 142 paired to the hosted applications and file system(s). Instead, according to the disclosed architecture, enhanced data agent(s) 242 operate on a separate and distinct computing platform, e.g., 206, and comprise the functionality to protect primary applications 110 from there without co-residing with the target applications on computing platform 202. Because it hosts primary applications in the production environment, computing platform 202 may be referred to herein as a "primary host." System 200 (and system 300) may comprise any number of primary hosts 202 executing any number of primary applications 110.

Standby/failover computing platform 222 hosts one or more applications 110S that are maintained in Live Synchronization with the primary applications 110 at computing platform 202. Computing platform 222 may be a different type of computing platform than primary host 202, e.g., physical or virtualized. Computing platform 222 may be a different kind of virtualized environment than primary host 202, e.g., a different manufacturer, different product, different version, etc. Computing platform 222 may host a different number of applications 110S than primary host 202, and may also host a different set of applications 110S that are Live Synched from a plurality of primary hosts 202. Also, one primary application 110 may be Live Synched to more than one standby/failover destination 222. System 200 (and system 300) may comprise any number of standby/failover computing platforms 222 supporting any number of synchronized applications 110S.

Enhanced storage manager 240 is analogous to storage manager 140 and further comprises functional enhancements for operating in the illustrative systems disclosed herein. Enhanced storage manager 240 manages system 200 (and system 300) as well as managing storage operations within the system. Enhanced storage manager 240 transmits queries and/or instructions to enhanced data agent 242 and to media agents 144/244 involved in the disclosed storage operations of the illustrative embodiments. In some embodiments, storage manager 240 orchestrates (e.g., controls, instructs, and monitors) the performance of the storage operations described here, such as: auto-discovery by enhanced data agent 242 relative to a set of primary applications 110; pushing application utilities (e.g., 570, 670) and/or changed block filters (e.g., 440, 540) to the primary hosts (e.g., 202); incremental backups and/or continuous data replication of the targeted primary applications 110; restore operations to the standby/failover platform, if applicable; detecting failure of primary applications 110 and directing synchronized application 110S to take over; etc., without limitation. For example, storage manager 240 transmits queries to the enhanced data agent 242 asking about applications in the illustrative system. In response to receiving such a query, enhanced data agent 242 begins the process of automatic discovery of the applications and their operational properties, such as type of application, file system configuration, primary data configuration (e.g., storage volume IDs) and disk image (e.g., VMDK-1 450). The enhanced storage manager 240 may instruct the enhanced data agent 242 to proceed with further discovery of whether connectors/APIs and/or changed block trackers are natively available in the discovered applications. In some alternative embodiments, the enhanced data agent 242 performs these discovery steps autonomously without explicit instruction from storage manager 240. Storage manager 240 may further provide scheduling information to enhanced data agent 242, e.g., how often to execute incremental backups and how often to synchronize the backups to the standby destination. Storage manager 240 may also instruct when to perform a baseline full backup of the targeted primary application 110.

Enhanced data agent 242 is analogous to data agent 142 and further comprises functional enhancements for operating in the illustrative systems disclosed herein. Enhanced data agent 242 is largely responsible for performing and/or causing to perform the majority of the functionality disclosed herein. See, e.g., method 700. Illustrative features of enhanced data agent 242 include one or more of the following without limitation: identifying applications 110 on host computing platforms; determining whether the identified applications are targeted for Live Sync (e.g., based on instructions from storage manager, based on type of application, based on host, etc.); determining whether targeted applications comprise connectors/APIs for communicating with the enhanced data agent, and if not, installing such functionality (application utilities); auto discovering the targeted applications' operational characteristics, including identifying and locating the disk image that represents each targeted application; determining whether the targeted utilities are capable of self-tracking changed data blocks from write operations, and if not, installing such functionality (application-specific block change filter); managing ongoing synchronization based on the changed blocks, by applying block changes to the standby copy of the disk image that represents the respective application—thus keeping the standby copy of the disk image synchronized with the primary disk image; detecting a failure of the primary application 110 and causing the synchronized application 110S to boot up from the standby copy of the disk image to begin operating in place of the primary application 110. Enhanced data agent 242 also supports reverse synchronization whereby an active standby application is reverse synchronized back to a proper primary platform, e.g., after recovery from a disaster when a primary platform is operational and ready. More details are given in subsequent figures.

Enhanced data agent 242 may be any type of block-level data agent, e.g., a virtual server data agent type when associated with computing platform 202 that is a virtual server. The enhanced functionality of data agent 242 disclosed herein is implemented irrespective of the type of data agent.

System 200 (and system 300) may comprise any number of secondary storage computing devices 206 and enhanced data agents 242, sufficient to enable the application-specific Live Synchronization functionality disclosed herein. In addition, traditional pairs of application/file system and data agent 142 also may be configured in the disclosed system for applications that are not targeted for Live Synchronization.

Logical pathways 1, 2, and 3 represent logical pathways for inter-component communications and/or data flows and are depicted by bold dotted arrows. These logical pathways (as well as others like them depicted in other figures herein) depict certain communication aspects of the illustrative systems, and are not a reflection of or limited to certain communications infrastructure, nor do they necessarily depict direct communications between the respective components, nor do they necessarily include every component needed to support the depicted logical pathway. Any physical communications infrastructure known in the art may be implemented to carry the inter-component communications and data flows described herein.

Logical pathway 1 between enhanced data agent 242 and computing platform 202, which hosts the primary applications, is used generally for auto-discovery of the applications, pushing application utility 570/670, pushing changed block filter 440/540, quiescing and un-quiescing the targeted application, and instructing certain targeted applications to perform self-backups, e.g., full and/or incremental backups.

Logical pathway 2 captures data blocks from the primary application and stores them to an intermediary secondary storage device 108. These data blocks may take the form of an initial baseline full backup of the targeted application's disk image followed by subsequent incremental backups. A media agent 144 (not shown) is generally associated with and acts as a storage portal to secondary storage device 108.

Logical pathway 3 is used for transmitting data blocks from the intermediary secondary storage device 108 to the destination data storage device 204. This takes the form of a restore operation of the backed up data blocks to a standby copy of the disk image of the targeted application. Because the restore operation follows and may be asynchronous with the backups to the intermediary storage, it is referred to as "delayed synchronization." The delayed synchronization updates the standby copy of the disk image (e.g., 460), enabling the standby application to become synchronized to the primary. The standby image (e.g., 460) is then used as the boot image when the synchronized application 110S must take over from the primary 110, e.g., when the primary application fails.

Notably, some components are not explicitly depicted in the present figure (or in other figures herein), e.g., a media agent 144 used for storing backups to secondary storage device 108. Likewise, certain communication pathways and signaling connections also are not depicted, e.g., a media agent 144 used for restoring the backup copies to the standby destination may be the one depicted in the present figure or may be another media agent designated for the restore tasks. Some further details are depicted and/or described in subsequent figures.

FIG. 3 is a block diagram illustrating some salient portions of a system 300 for application-level Live Synchronization using block-level continuous data replication, according to another illustrative embodiment of the present invention. The illustrative system 300 employs block-level (as contrasted to file-level) continuous data replication ("CDR") as between the primary data application and the standby disk image of the targeted application stored in the destination data storage 204. As shown here, application 110-1 and its associated file system 111-1 and associated primary data stored in volume 1 and volume 2 are Live Synched using block-level CDR to standby/failover computing platform 222, resulting in a so-called "synchronized application 110S-1" that is a standby for primary application 110-1. On a failure of application 110-1 or its file system 111-1 or its associated primary data storage 104, synchronized application 110S-1 can take over on computing platform 222. Synchronized application 110S-1 becomes the primary until such time as control is restored to application 110-1. Logical pathways 1 and 4 represent logical pathways for inter-component communications and/or data flows and are depicted by bold dotted arrows. These logical pathways depict certain communication aspects of the illustrative systems, and are not a reflection of or limited to certain communications infrastructure, nor do they necessarily depict direct communications, nor do they necessarily include every component needed to support the logical pathway. Any physical communications infrastructure known in the art may be implemented to carry the inter-component communications described herein. The system can utilize the deduplicated copy techniques described in U.S. Pat. No. 9,239,687, entitled "Systems and Methods for Retaining and Using Data Block Signatures in Data Protection Operations" and in U.S. patent application Ser. No. 14/721,971, entitled "Replication Using Deduplicated Secondary Copy Data."

Logical pathway 1 is analogous to logical pathway 1 in FIG. 2.

Logical pathway 4 is used for capturing changed data blocks from the targeted primary application and on a continuing basis transporting them to update the standby disk image at the standby/failover destination. As shown here, application 110-1 and its associated file system 111-1 and associated primary data stored in volume 1 and volume 2 are Live Synchronized to standby/failover computing platform 222 using block-level CDR, resulting in a so-called "synchronized application 110S-1" that is a standby for primary application 110-1. Synchronized application 110S-1 becomes the primary until such time as control is restored to application 110-1. In contrast to FIG. 2, the system of FIG. 3 uses block-level continuous data replication ("CDR") to update the standby copy of the disk image and there is no intermediate storage and no delayed synchronization. As a result, block-level continuous data replication is a preferred embodiment for keeping the standby copy of the disk image as closely synchronized in time with the primary application 110.

Even though system 200 and system 300 are illustrated in separate figures, the invention is not so limited. A given system according to the present invention may perform Live Synchronization via incremental backups and delayed sync for some targeted application(s) (as shown in system 200) while also performing Live Synchronization via block-level continuous data replication for other targeted application(s) (as shown in system 300) and may furthermore NOT keep certain other applications Live Synched at all (as shown in FIG. 10). The choice of one approach over the other depends on bandwidth, processing capacity at the primary host, and/or concerns over whether and how closely the standby system should be kept synchronized to the primary.

Figure 4A:
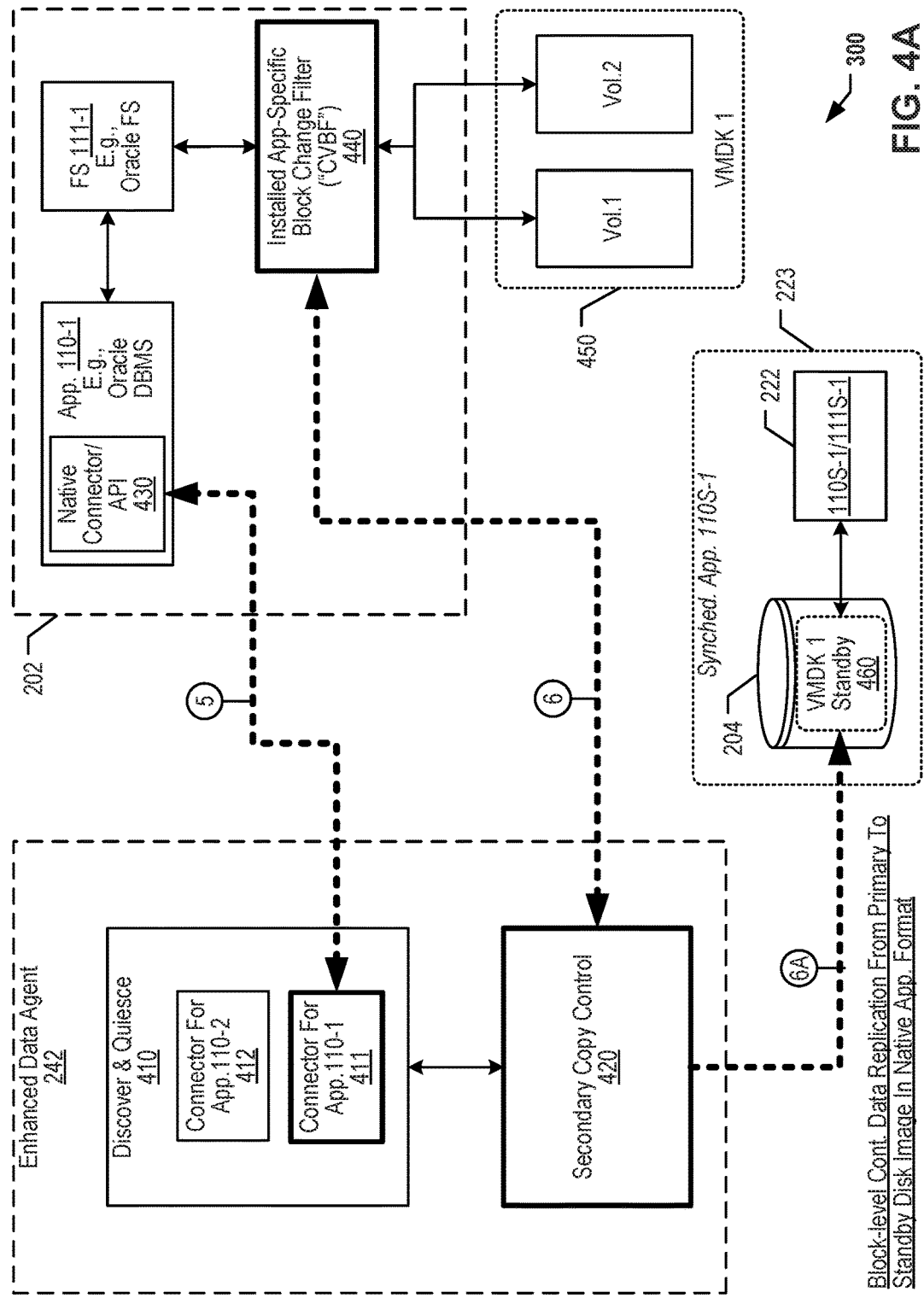
FIG. 4A is a block diagram illustrating some details of system 300, including logical pathways between certain components for Live Synchronization of an illustrative application 110-1 using block-level continuous data replication from primary disk image to a standby copy in native application format.

FIG. 4A is a block diagram illustrating some details of system 300, including logical communication pathways between certain components for Live Synchronization of an illustrative application 110-1 using block-level continuous data replication from primary disk image to a standby copy in native application format. FIG. 4A depicts: computing platform 202 hosting primary application 110-1 (e.g., Oracle DBMS), which comprises a native connector/API 430, also hosting file system 111-1 (e.g., Oracle FS), and further hosting an installed application-specific block change filter 440; enhanced data agent 242 comprising discover and quiesce module 410, which comprises app-specific connectors 411 and 412, and further comprising a secondary copy controller 420; application-specific disk image 450 (e.g., VMDK-1 comprising volume 1 and volume 2); and synchronized application 110S-1 comprising application 110S-1 and file system 111S-1 hosted by computing platform 222 and standby copy 460 of the application-specific disk image stored in storage device 204. The present figure depicts a number of inter-component logical pathways described in further detail below.

Primary application 110-1 is any executable application that is hosted by a computing platform such as 202 (e.g., virtual machine, physical server, container, etc.). Application 110-1 is targeted for Live Synchronization according to the illustrative embodiment. Illustrative types of applications that might be targeted for Live Synch include Oracle database management systems (DBMS) from Oracle Corp.; SQL database management systems from Microsoft Corp.; etc.

File system 111-1 is any file system that is associated with the application 110-1, i.e., wherein the file system 111 controls, organizes, and maintains the structure and logic (e.g., directories, hierarchies) of data used by application 110 and controls how the application 110 accesses mass storage including how data is stored thereto and retrieved therefrom. As illustrated in the present figure, file system 111-1 controls storage volume 1 and storage volume 2 in primary storage device 104, which collectively store the disk image for application 110-1 (e.g., VMDK-1).

The term "synchronized application 110S-1" (component 223) is used herein as shorthand to refer to application 110S-1 and file system 111S-1, which are hosted by computing platform 222 coupled with a standby copy 460 of the application-specific disk image that is stored in storage device 204. Although computing platform 222, which hosts the standby synchronized application, may be different from computing platform 202 which hosts the primary application, the respective applications, i.e., 110-1 and 110S-1, are the same; likewise the corresponding file systems 111-1 and 111S-1 are sufficiently alike to enable application 110S-1 to boot up from standby copy 460 of the disk image and to access/manage data therefrom via file system 111S-1. The standby copy 460 of the disk image is in application-native format and kept up to date according to the illustrative embodiments (e.g., using block-level continuous data replication) so that application 110S-1 may boot up from the standby image and operate successfully as needed; accordingly, standby copy 460 may but need not comprise a data volume 1 and a data volume 2 (not shown) that correspond to the primary data volumes 1 and 2 in storage device 104. As noted elsewhere herein, in some embodiments, only one of volumes 1 and 2 may be synchronized to the standby/failover destination and not the other volume.

Discover and quiesce module 410 is a sub-component of enhanced data agent 242. Discover and quiesce module 410 is generally responsible for establishing communications with computing platforms such as 202 that host applications in system 200/300, and then using an application-specific connector (e.g., 411, 412) to communicate with respective applications 110, discover their configurations and operational characteristics, quiesce them prior to a secondary copy operation, and un-quiesce them after the secondary copy is taken. Discover and quiesce module 410 may comprise any number of application-specific connectors such as 411 and 412 and/or other connectors such as API-specific connectors that can use a given API to communicate with any number of applications 110 supporting that API. Discover and quiesce module 410 also may "push" to computing platform 202 an application utility 570 (see FIG. 5) which is to couple to the targeted application 110 hosted by computing platform 202.

Application-specific connectors 411 and 412 are sub-components of enhanced data agent 242. Each application-specific connector 411/412 comprises logic that is capable of communicating with a particular type of application 110, or more particularly, communicating with certain logic associated with the application that allows the connector 411/412 to discover the application's configuration and operational characteristics, including type of application, version, file system, storage configuration, nomenclature, etc.; instruct the application 110 to quiesce; and instruct the application 110 to un-quiesce. The application-specific connector 411/412 may communicate with certain native features in the application 110, such as a native connector or application programming interface ("API") 430; in some cases, an application 110 that lacks such a native feature will be coupled with an installed application utility 570 (see FIG. 5) that is pushed thereto by the enhanced data agent 242 (e.g., using discover and quiesce module 410).

Secondary copy controller 420 is a sub-component of enhanced data agent 242, which is responsible for determining whether a targeted application 110 comprises a native feature for tracking changed data blocks (e.g., 680), and if not, pushing such a utility thereto (e.g., 440, 540); instructing a changed block utility (whether native or installed) to transmit changed data blocks to data agent 242; receiving changed data blocks from the changed block utility (e.g., 440, 540, 680); and continuously transmitting them to the standby disk image 460 for continuous update (or, in come embodiments where enhanced data agent 242 lacks control over storage device 204, transmitting the changed data blocks to another data agent 242 that resides on destination platform 222 and which in turn will update the standby disk image 460). Secondary copy controller 420 also may generate full backups of application-specific disk image 450 as a baseline operation before application-specific incremental backups and/or CDR begins for the application. Thus, secondary copy controller 420 comprises logic for supporting application-specific Live Synchronization operations relative to certain targeted applications.

Native connector/API 430 is a feature of primary application 110. This feature is generally provided by the application's manufacturer/vendor so that external entities may communicate and interact with the application. In some cases, the native connector/API is a published standard that is used by multiple vendors; in other cases, the native connector/API is proprietary to the application's manufacturer/vendor, but is published by the vendor to enable communications and interactions.

Installed application-specific block change filter 440 ("CVBF") is a utility that is part of the illustrative embodiment and is supplied by and pushed to computing platform 202 by enhanced data agent 242 (e.g., using secondary copy controller 420); it is not native to the application 110-1 and file system 111-1 being tracked. Filter 440 may operate in the operating system of the host computing platform 202. Filter 440 monitors write operations performed by primary application 110-1 and keeps track of changes to data blocks resulting from these write operations. Though the changed data blocks as written by application 110-1 reside in the application's disk image 450 (e.g., in volume 1 or volume 2), filter 440 tracks the changes relative to a baseline full backup and then relative to subsequent changes. As a result, filter 440 transmits changed data blocks on an ongoing basis for block-level continuous data replication. In some embodiments, the changed blocks are accumulated at an intermediate storage as shown in FIG. 2. In some other embodiments, the changed data blocks are saved by a media agent as application-consistent point-in-time recovery points—apart from being continuously replicated to the standby copy of the disk image—as shown in FIG. 4C.

Application-specific disk image 450 (e.g., VMDK-1 comprising volume 1 and volume 2) comprises all primary data including metadata (e.g., application state, configuration, etc.) associated with application 110-1 and its file system 111-1. If we want to have a synchronized standby application 110S-1, disk image 450 is the collective data structure to be copied to and maintained current at the standby/failover destination storage 204. A copy of disk image 450 is maintained as standby copy 460 (in application-native format) from which application 110S-1 can boot up to take over from the primary application 110-1.

Logical pathways 5, 6, and 6A represent logical pathways for inter-component communications and/or data flows and are depicted by bold dotted arrows. These logical pathways depict certain communication aspects and are not a reflection of or limited to certain communications infrastructure, nor do they necessarily depict direct communications, nor do they necessarily include every component needed to support the depicted logical pathway. Any physical communications infrastructure known in the art may be implemented to carry the inter-component communications described herein.

Logical pathway 5 depicts the interactions, including control messages and responses, between application-specific connector 411 and its target application 110-1 using native connector/API 430, e.g., used for auto-discovery, quiescing and un-quiescing application 110-1.

Logical pathway 6 depicts the interactions between secondary copy controller 420 and installed application-specific block change filter 440 (pushed thereto by e.g., controller 420). Interactions include pushing filter 440 to computing platform 202 for purposes of tracking a targeted application's changed blocks; installing block filter 440 thereon, associating it with application 110-1/file system 111-1/disk image 450, and activating filter 440; and transmitting application-specific changed blocks from filter 440 to controller 420 on an ongoing basis to support block-level continuous data replication.

Logical pathway 6A depicts the transmission of application-specific changed data blocks from controller 420 to standby copy 460. In configurations where enhanced data agent 242 has control over storage device 204 which houses standby copy 460, controller 420 continuously transmits the changed data blocks received from filter 440 to standby copy 460, thereby keeping standby copy 460 up-to-date with changing data blocks. In configurations where enhanced data agent 242 lacks control over storage device 204 which houses standby copy 460, an intermediary data agent 242 (not shown) is installed on the standby/failover computing platform (e.g., 222) and receives the changed data blocks transmitted by controller 420 and in turn updates standby copy 460 on an ongoing basis. Thus, continuous data replication may occur directly from enhanced data agent 242 or indirectly via a destination-based data agent (not shown).

Figure 4B:
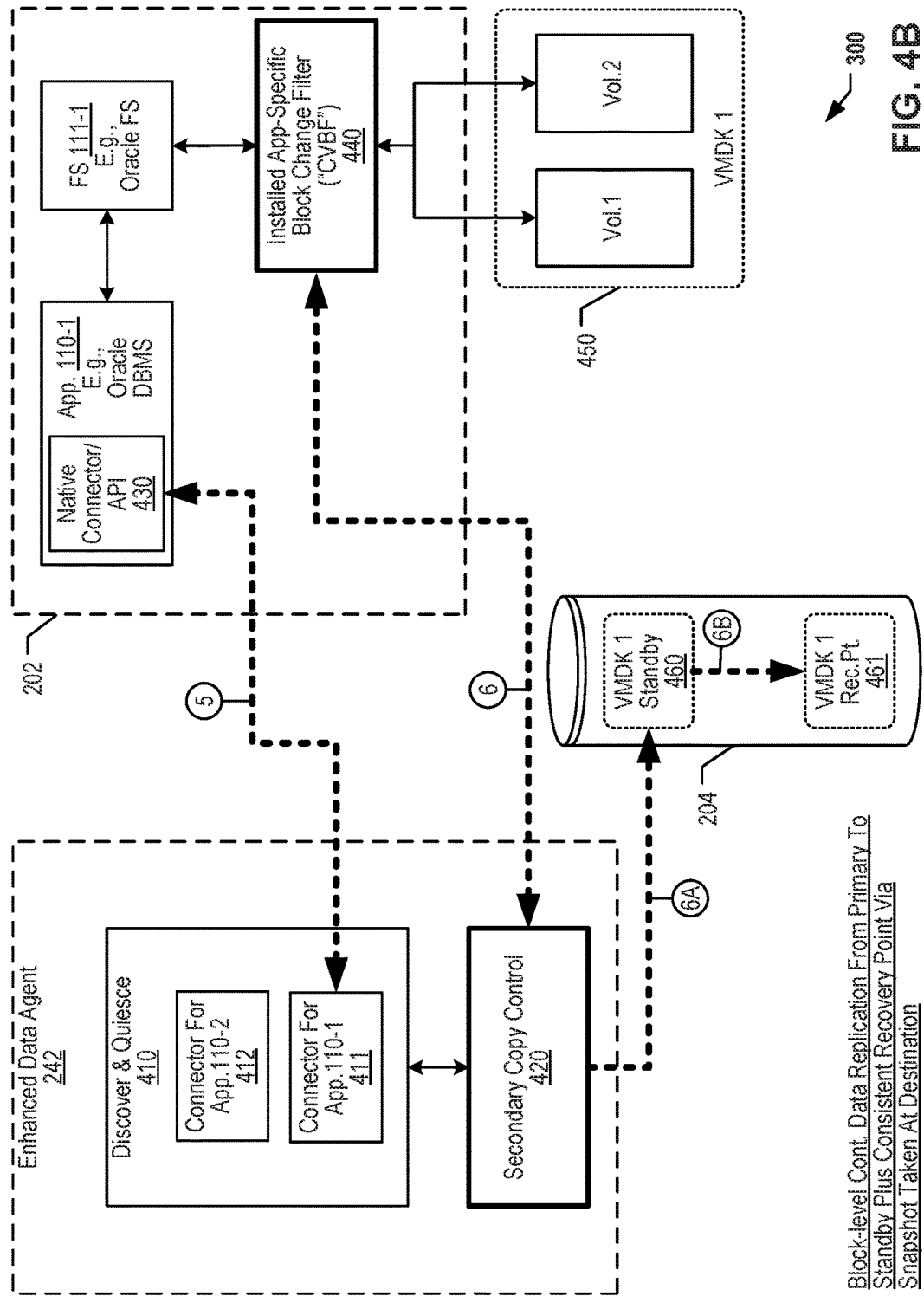
FIG. 4B is a block diagram illustrating some details of system 300, including logical pathways between certain components for Live Synchronization of an illustrative application 110-1 using block-level continuous data replication from primary disk image to a standby copy and further depicting creating application-consistent (point-in-time) recovery points via snapshots taken at the standby/failover destination.
Figure 4C:
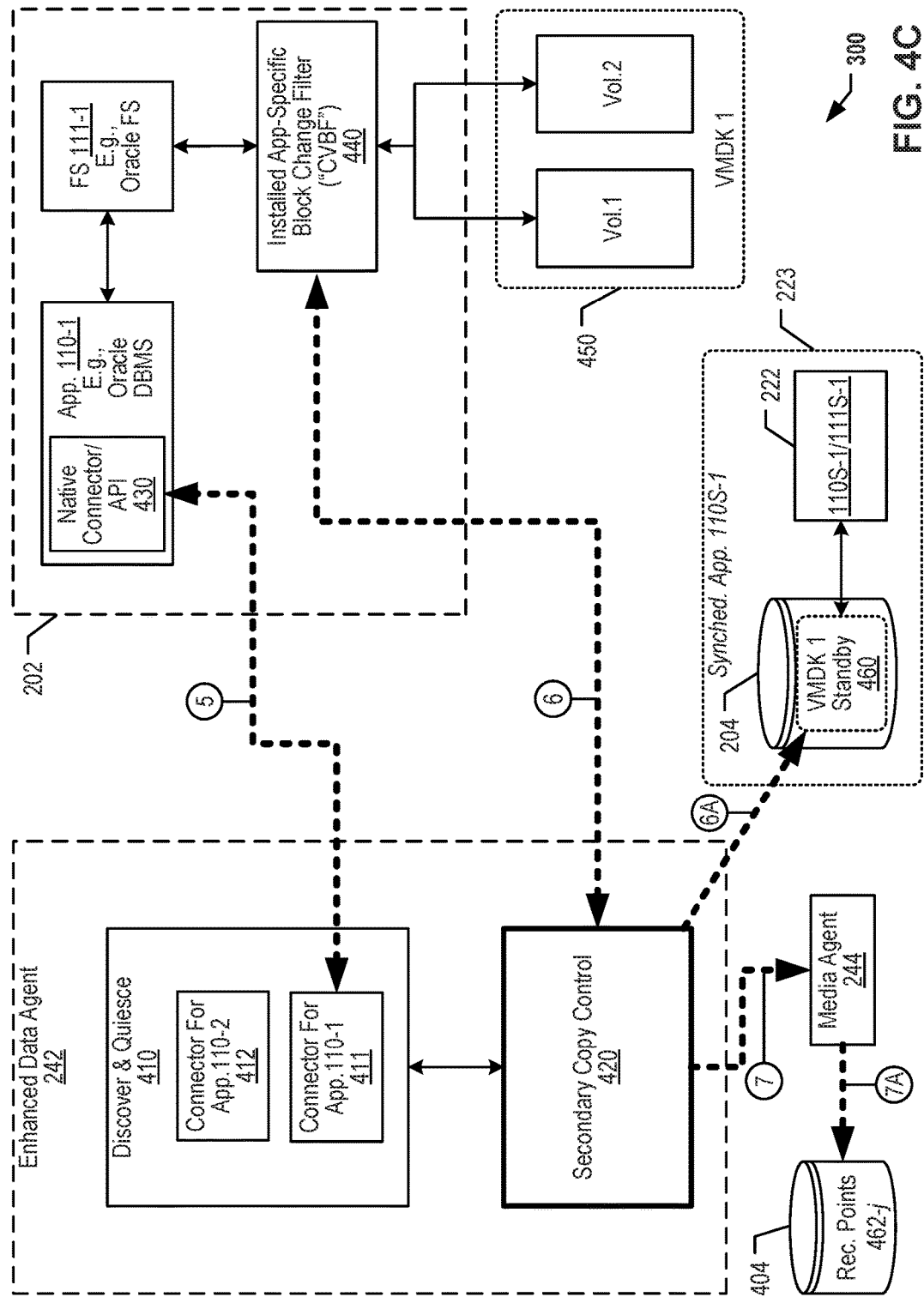
FIG. 4C is a block diagram illustrating some details of system 300, including the use of a media agent to save application-consistent (point-in-time) recovery points to secondary storage when using block-level continuous data replication to Live Synchronize an application 110-1.

FIG. 4B is a block diagram illustrating some details of system 300, including logical communication pathways between certain components for Live Synchronization of an illustrative application 110-1 using continuous data replication from primary disk image to a standby copy and further depicting the generating of consistent (point-in-time) recovery points via snapshots taken at the standby/failover destination. FIG. 4B depicts some of the same components as FIG. 4A and additionally depicts recovery point 461 stored in storage device 204 at the standby/failover destination. Certain operational components, e.g., standby/failover computing platform 222, are not depicted in the present figure due to lack of space.

Logical pathways 5, 6, and 6A were described in the preceding figure.

Logical pathway 6B depicts how a snapshot 461 of standby copy 460 is taken and stored at the standby/failover destination; the snapshot 461 is to be used as an application-consistent point-in-time recovery point in case it is needed for standby application 110S (or possibly primary application 110) to revert to good known past point in time. Accordingly, when enhanced data agent 242 (e.g., secondary copy controller 420) becomes aware that primary application 110 is in a "good state," (e.g., because it has been quiesced or passed a maintenance routine, etc.), enhanced data agent 242 not only transmits changed data blocks to the standby/failover destination using logical pathway 6A, but additionally sends control messages or instructions to the destination storage device (e.g., 204) to take a hardware snapshot of the updated standby copy 460 and store the hardware snapshot as a separate identifiable data structure 461. Thus, snapshot 461 becomes a known good copy that can act as a recovery point for the synchronized application. Alternatively, instead of communicating with the destination storage device, enhanced data agent 242 may instruct the standby/failover computing platform (e.g., 222) to take a software snapshot of the standby copy 460 and store it as a separately identifiable data structure 461. Because it is a snapshot of standby copy 460, which is in application-native format, snapshot 461 is also in the same application-native format and can also be used to rapidly boot up application 110S therefrom.

FIG. 4C is a block diagram illustrating some details of system 300, including the use of a media agent to save application-consistent (point-in-time) recovery points to secondary storage when using block-level continuous data replication to Live Sync an application 110-1. FIG. 4C depicts some of the same components as FIG. 4A and additionally depicts a media agent 244 that saves application-consistent (point-in-time) recovery points based on changed data blocks from enhanced data agent 242 and saves the recovery point copies 462 to an associated secondary storage device 404. As in FIG. 4B, when enhanced data agent 242 (e.g., secondary copy controller 420) becomes aware that primary application 110 is in a "good state," (e.g., because it has been quiesced or passed a maintenance routine, etc.), enhanced data agent 242 not only transmits changed data blocks to the standby/failover destination using logical pathway 6A, but additionally sends control messages or instructions to media agent 244 informing it of a "good state."

Media agent 244 is similar to media agent 144 and acts as a portal to the associated storage device 404. Additionally, media agent 244 comprises intelligent logic for receiving and tracking changed data blocks received from enhanced data agent 242 and maintaining point-in-time copies 462 as recovery points of known good stated, e.g., every 15 minutes, which could be used for a restore operation in case an older good point in time were required. Media agent 244 further comprises logic for consolidating multiple recovery points periodically to a consolidated current version, e.g., consolidating quarter-hour copies 462 into an hourly copy and consolidating hourly copies into one end-of-day copy on a daily basis. The copies 462 may be restored to any computing platform in system 300 (or 200) as needed using restore operations that are well known in the art.

Logical pathways 5, 6, and 6A were described in preceding figures.

Logical pathway 7 depicts how changed data blocks are transmitted by enhanced data agent 242 to media agent 244, and logical pathway 7A depicts how media agent 244 writes the changed data blocks to copies 462.

Figure 5:
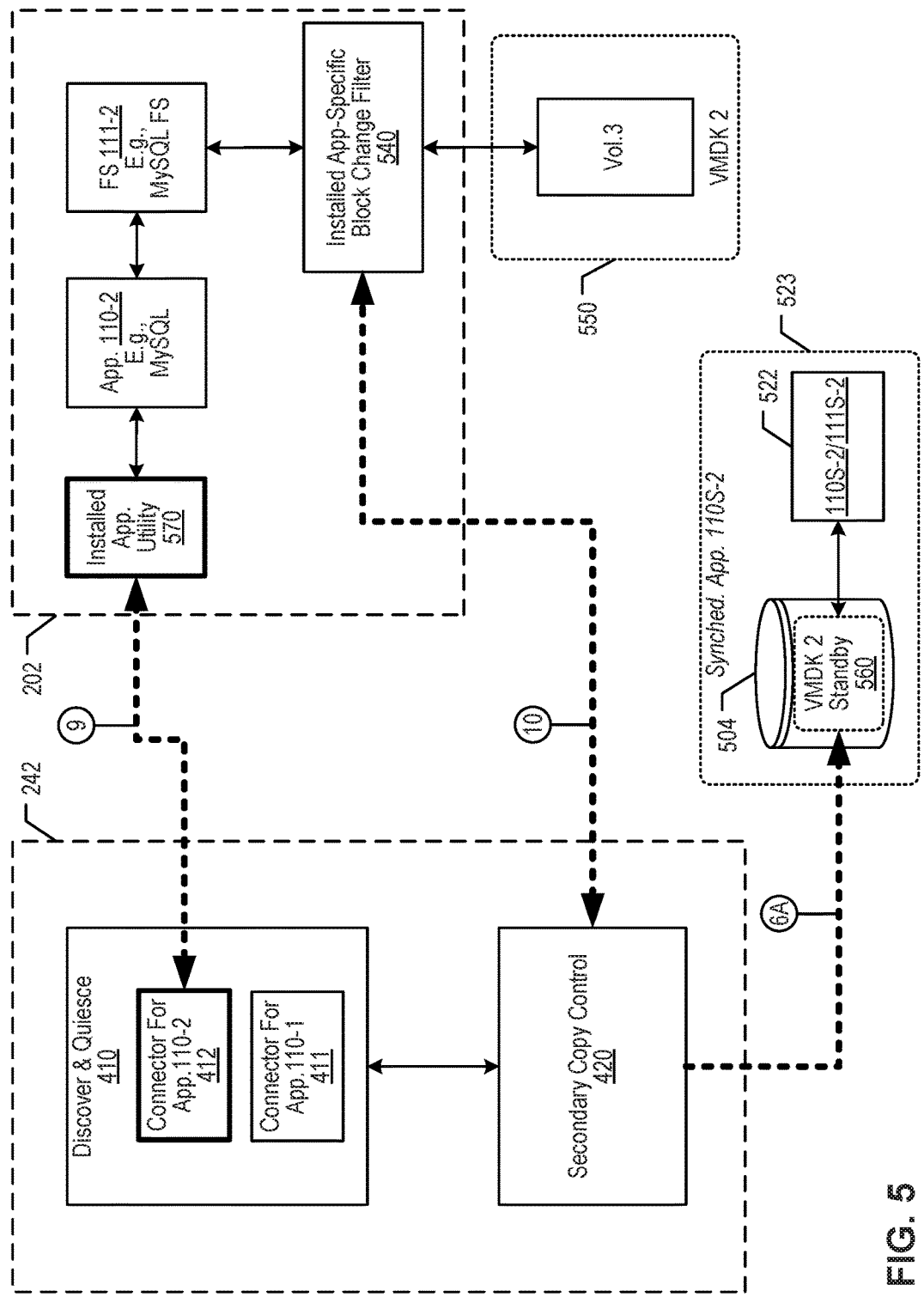
FIG. 5 is a block diagram illustrating some details of system 300, including logical pathways between certain components for Live Synchronization of an illustrative application 110-2 using block-level continuous data replication to the standby copy of the disk image.

FIG. 5 is a block diagram illustrating some details of system 300, including logical pathways between certain components for Live Synchronization of an illustrative application 110-2. FIG. 5 depicts: computing platform 202 hosting primary application 110-2 (e.g., MySQL DBMS), which lacks a native connector/API and is coupled to an installed application utility 570, also hosting file system 111-2 (e.g., MySQL FS), and further hosting an installed application-specific block change filter 540; enhanced data agent 242 comprising discover and quiesce module 410, which comprises app-specific connectors 411 and 412, and further comprising a secondary copy controller 420; application-specific disk image 550 (e.g., VMDK-2 comprising volume 3); and synchronized application 110S-2 (component 523), comprising application 110S-2 and file system 111S-2 and standby copy of the application-specific disk image 560 stored in storage device 504. The present figure depicts a number of inter-component logical pathways as described in further detail below.

Connector 412, is similar to connector 411, but is application-specific for communicating with application 110-2, e.g., MySQL.

Synchronized application 110S-2 (component 523) represents the standby instantiation of primary application 110-2. Synchronized application 110S-2 need not use the same computing platform and mass data storage as synchronized application 110S-1 (component 223), even though the source primary applications and their primary data were co-resident on computing platform 202 and storage device 104, respectively. Here, standby copy 560 of the disk image VMDK2 is stored on a different storage device 504 and the standby application 110S-2 and its associated file system 111S-2 are hosted by a different computing platform 522, which is distinct from 222 hosting 110S-1/111S-1.

Installed application-specific block change filter 540 is analogous to filter 440, but operates relative to application 110-2 and its associated file system 111-2 and primary data stored in disk image 550.

Installed application utility 570 (which may be embodied as a plug-in to the targeted application) is installed and operates on computing platform 202 and is pushed thereto by enhanced data agent 242 (e.g., using discover and quiesce module 410) upon determining that the targeted application 110-2 lacks a native connector/API feature. Installed application utility 570 comprises logic (including application-specific logic) for coupling to application 110-2 and comprises further logic for communicating with connector 412 to receive and respond to control messages therefrom. For example, utility 570 comprises logic for discovering operational characteristics of application 110-2 and reporting the discovered information to connector 412 at enhanced data agent 242; and quiescing and un-quiescing application 110-2 in response to control message received from connector 412.

Logical pathways 9, 10, and 6A represent logical pathways for inter-component communications and/or data flows and are depicted by bold dotted arrows. These logical pathways depict certain communication aspects of the illustrative systems, and are not a reflection of or limited to certain communications infrastructure, nor do they necessarily depict direct communications, nor do they necessarily include every component needed to support the depicted logical pathway. Any physical communications infrastructure known in the art may be implemented to carry the inter-component communications described herein.

Logical pathway 6A was described in an earlier figure.

Logical pathway 9 depicts the interactions, including control messages and responses, between application-specific connector 412 and its target application 110-2 using installed application utility 570, e.g., used for auto-discover, quiescing and un-quiescing application 110-2.

Logical pathway 10 depicts the interactions between secondary copy controller 420 and installed application-specific block change filter 540 (pushed thereto by e.g., controller 420). Interactions include pushing filter 540 to computing platform 202 for purposes of tracking a targeted application's changed blocks; installing block filter 540 thereon, associating it with application 110-2/file system 111-2, and disk image 550, and activating filter 540; and transmitting application-specific changed blocks to controller 420.

Figure 6:
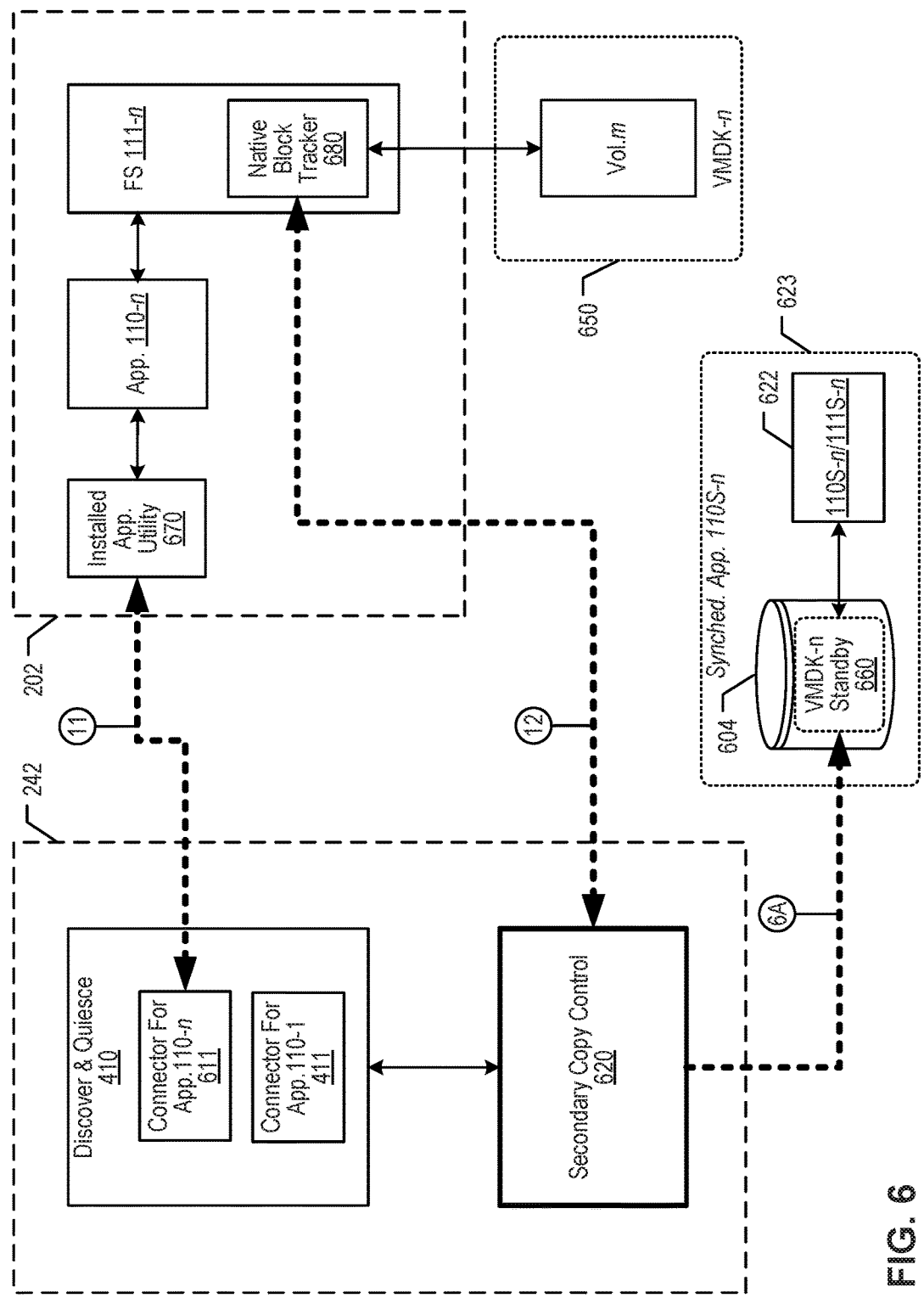
FIG. 6 is a block diagram illustrating some details of system 200 or 300, including logical pathways between certain components for Live Synchronization of an illustrative application 110-*n* using block-level continuous data replication to the standby copy of the disk image.

FIG. 6 is a block diagram illustrating some details of system 300, including logical pathways between certain components for Live Synchronization of an illustrative application 110-n that executes on computing platform 202.

FIG. 6 depicts: computing platform 202 hosting primary application 110-n, which lacks a native connector/API and is coupled to an installed application utility 670, and also hosting file system 111-n, which comprises a native block tracker 680; enhanced data agent 242 comprising discover and quiesce module 410, which comprises app-specific connectors 411 and 611, and further comprising a secondary copy controller 620; application-specific disk image 650 (e.g., VMDK-n comprising volume m); and synchronized application 110S-n (component 623), comprising application 110S-n and file system 111S-n hosted by computing platform 622 and a standby copy 660 of the application-specific disk image stored in storage device 604. The present figure depicts a number of inter-component logical pathways described in further detail below.

Connector 611 is application specific and in communication with installed application utility 670, similar to connector 412 and utility 570, respectively, described in FIG. 5. Application utility 670 may be embodied as a plug-in to primary application 110-n.

Secondary copy controller 620 is analogous to controller 420 described in an earlier figure, but communicates with a native block tracker 680 that is a feature of file system 111-n and/or of its associated application 110-n. As a result, controller 620 comprises the logic and message set required to communicate with the native block tracker 680 to perform some of the operation described for controller 420. For example, controller 620 has logic that knows how tracker 680 operates, such as what data structures it generates and maintains to keep track of block changes written by application 110-n (e.g., a log, a journal, etc.), and further knows the message set required for communicating with tracker 680. Consequently, controller 620 may request a copy of a changed block log or journal maintained by native tracker 680 and comprises logic for parsing the received log or journal to determine which data blocks have changed and when and for processing them further for purposes of generating incremental backups or CDR.

Disk image 650 is analogous to disk image 550 and comprises primary data for application 110-n and its associated file system 111-n, stored in volume "m."

Native block tracker 680 is a feature of application 100-n or its associated file system 111-n. Native block tracker 680 may generate tracking data structures such as transaction logs or journals that reflect what data blocks changes as a result of write operations performed by application 110-n.

Logical pathways 11, 12, and 6A represent logical pathways for inter-component communications and/or data flows and are depicted by bold dotted arrows. These logical pathways depict certain communication aspects of the illustrative systems, and are not a reflection of or limited to certain communications infrastructure, nor do they necessarily depict direct communications, nor do they necessarily include every component needed to support the depicted logical pathway. Any physical communications infrastructure known in the art may be implemented to carry the inter-component communications described herein.

Logical pathway 6A was described in an earlier figure.

Logical pathway 11 depicts the interactions, including control messages and responses, between application-specific connector 611 and its target application 110-n using installed application utility 670, e.g., used for auto-discovery, quiescing and un-quiescing application 110-n.

Logical pathway 12 depicts the interactions between secondary copy controller 620 and native block tracker 680 associated with application 110-n and file system 111-n. Interactions include sending control messages to tracker 680 (e.g., requesting logs/journals, etc. and/or instructing that an incremental backup be taken) and transmitting application-specific changed blocks to controller 620.

Figure 7:
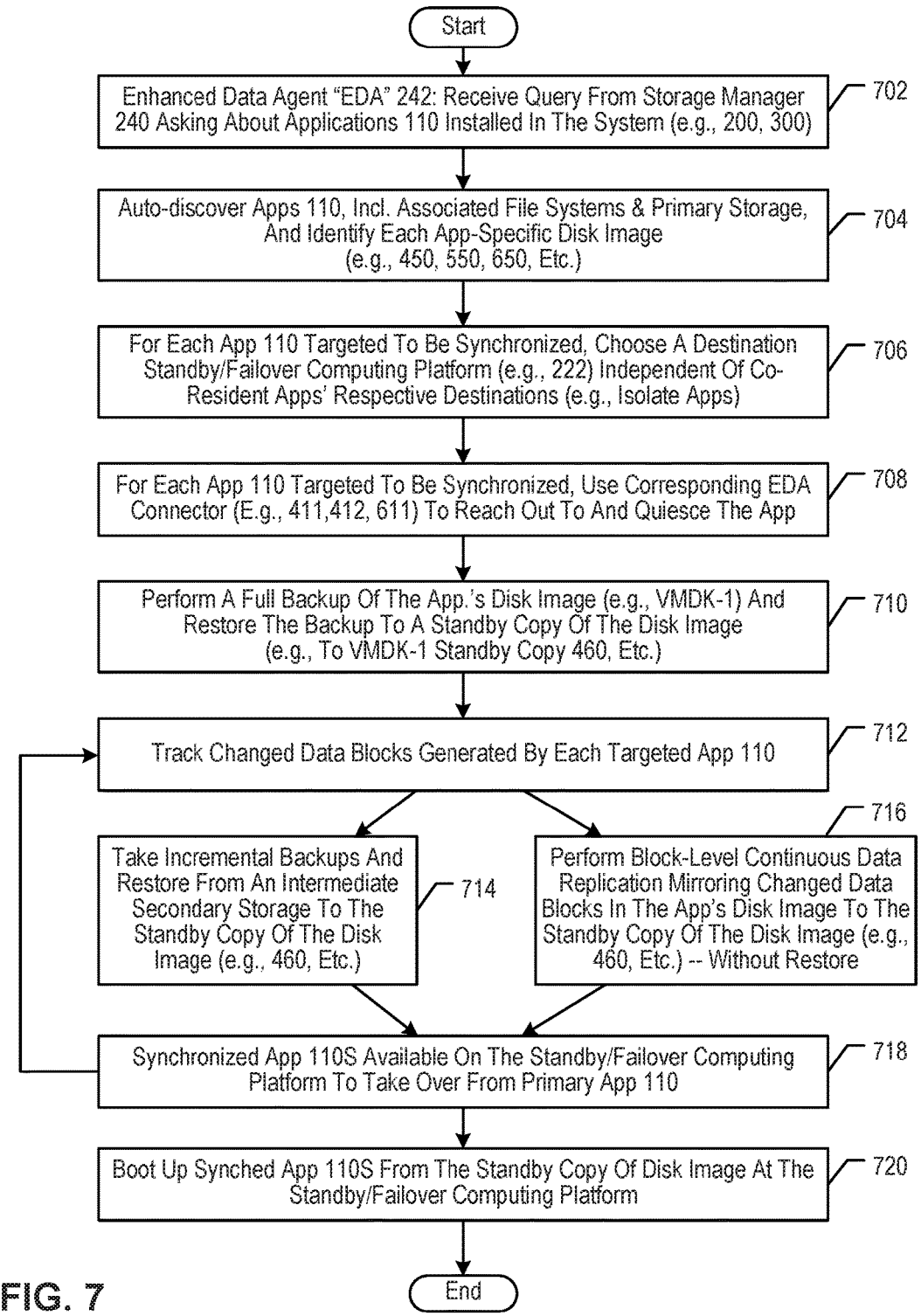
FIG. 7 depicts some salient operations of a method 700 according to an illustrative embodiment of the present invention.

FIG. 7 depicts some salient operations of a method 700 according to an illustrative embodiment of the present invention. In general, method 700 may operate in system 200 or 300 or in a hybrid system 200/300 that includes both delayed sync and block-level continuous data replication. In general, method 700 may be performed by enhanced data agent 242 in conjunction with storage manager 240, as well as connectors/APIs and block filters operating on the host computing platform, as described in further detail below. In some circumstances, media agents, e.g., 144 and 244, also perform some operations.

At block 702, enhanced data agent ("EDA") 242 receives query(ies) from storage manager 240 asking about applications 110 installed in the storage management system 200 or 300. Alternatively, storage manager 240 instructs enhanced data agent 242 to auto-discover applications 110 installed on one or more computing platforms that are in communication with the enhanced data agent. The queries and/or instructions may comprise configuration or topology information to enable EDA 242 to perform the auto-discovery.

At block 704, enhanced data agent 242 auto-discovers applications 110, including respective associated file systems 111 and primary storage 104, and identifies each application-specific disk image (e.g., 450, 550, 650) residing in primary storage. The application-specific disk image may take different forms depending on the computing platform, e.g., a virtualized environment uses VMDK disk images. More details are given in a subsequent figure.

At block 706, for each application 110 targeted to be Live Synchronized, a destination standby/failover computing platform (e.g., 222, 522, 622, 1022, etc.) is chosen, which is independent of other co-resident applications' respective destinations. First, it should be noted that all applications 110 need NOT be targeted for Live Synchronization. Second, the choice of destination for any given targeted application is made by storage manager 240, e.g., via input from a system administrator, and communicated to enhanced data agent 242. In some alternative embodiments, enhanced data agent 242 automatically chooses the standby/failover destination of each targeted application based on knowledge about the network and available destinations available to the enhanced data agent 242.

One additional aspect is to provide options for administrators to even more closely tailor Live Synchronization to their needs. For example, a system administrator may select only certain source data to be synchronized relative to a certain targeted application. Filtering criteria include logical volume, hard disk, and/or folders/files. This approach improves system performance by reducing the storage footprint of backups and of the standby copy, reduces network bandwidth, and saves on processing cycles required of the various components.

At block 708, for each application 110 targeted to be Live Synchronized, enhanced data agent 242 finds a suitable connector for the application and uses it (e.g., 411, 412, 611) to reach out to and quiesce the application 110.

At block 710, enhanced data agent 242 performs a full backup of the application's disk image (e.g., 450/VMDK-1) and restores the full backup to a standby copy of the disk image (e.g., to VMDK-1 standby copy 460) (a media agent 144 is involved for storing the backup). After the restore, the disk image copy is in application-native format. At this point, standby application 110S may be booted up from the disk image copy, e.g., 460. In some cases, the full backup is performed under command and control of storage manager 240 using proprietary messaging of components of the storage management system 200/300. In some cases, where the targeted application 110 has a self-backup feature, the full backup is performed by instructing the application 110 to generate a full backup of its disk image and transmit it to enhanced data agent 242.

At block 712, following the baseline full backup, changed data blocks generated by each targeted application 110 are tracked on an ongoing basis going forward. If the targeted application is synchronized using incremental backups (see, e.g., FIG. 2), control passes to block 714. If the targeted application is synchronized using block-level continuous data replication (see, e.g., FIG. 3), control passes to block 716.

At block 714, enhanced data agent 242 takes incremental backups, consolidates the block changes if appropriate, and restores from an intermediate secondary storage to the disk image standby copy (e.g., 460, etc.) at the standby destination. More details are given in a subsequent figure.

At block 716, enhanced data agent 242 performs block-level continuous data replication that mirrors changed data blocks in the application's disk image to the standby copy (e.g., 460) at the destination. The standby copy is updated continuously without having to restore from backup. As noted earlier, according to the illustrative embodiments, synchronization is application-specific, and therefore blocks 714 and 716 can co-exist in one system relative to different applications 110 therein. More details are given in a subsequent figure.

At block 718, synchronized application 110S (e.g., 223, 523, 623, etc.) is available at this point on the standby/failover computing platform (e.g., 222, 522, 622, respectively) to take over from primary application 110 based on the respective standby copy of the disk image (e.g., 460, 560, 660, respectively).

At block 720, a synchronized application 110S at the standby/failover computing platform is booted up from the corresponding copy of the disk image, which is in a ready state from the preceding block. A failure of the primary application 110 may be detected by the storage manager and/or by the enhanced data agent 242 and/or by the components with the application 110, e.g., 430, 440, 570, 540, 670, 680. Upon detecting and/or receiving a report of the failure, the storage manager 240 instructs enhanced data agent 242 to disable application 110 and to boot up the standby application 110S from the copy of the disk image (e.g., 460, 560, 660). Additional scenarios for performing the present block are described elsewhere herein, e.g., test scenarios.

Advantages. By booting from a copy of the disk image that is in application-native format, Live Sync keeps the switchover time from primary to standby to a minimum after a failure is detected in the primary. As compared to the traditional approach, the present approach takes substantially less time, because the traditional approach requires: (a) finding a backup copy of the failed application within the storage management system and executing one or more restore operations (e.g., restore full backup and then restore each incremental backup in turn) to bring the restored operation up to date, or (b) finding a backup copy of the entire disk comprising all primary data from the associated computing platform (e.g., storage device 104 comprising volumes 1, 2, 3, . . . , m), restoring the entire disk, and then identifying the target application and booting it up. Instead, the Live Synchronization approach disclosed herein specifically targets certain important applications for Live Sync, and maintains each targeted application in a "warm" state at the standby/failover destination by extracting only application-specific disk images from the source storage device 104 (e.g., only VMDK-1) and ensuring that block changes thereto are regularly pushed to the destination (e.g., using block-level CDR) so that the standby can quickly boot up from the standby disk image copy (e.g., 460, 560, 660). Importantly, the illustrative systems can support cross-platform Live Synchronization, such that the source/host and destination/standby computing platforms can be of different types and technologies, e.g., from physical server to virtual machine and vice-versa, from one type of virtualized environment to another, from one type of container to another, etc. Moreover, co-resident applications can be separated as needed independently of each other, such that co-resident primary applications can be dispersed to different and distinct standby/failover destinations (see FIG. 10), and vice-versa, previously separated primary applications can be Live Synchronized to the same standby/failover destination.

Block-level continuous data replication from primary to standby disk image without using intermediary backups and restores provides another important advantage, because it enables the illustrative system to keep the standby copy closely mirroring changes in the primary, so that little or no data is lost when a switchover from primary to standby is needed. The result is that a given application may be kept in a ready "warm" state at one or more standby/failover destinations, quite independent of how the application's co-resident applications and/or primary storage is treated in case of a failure in the primary production environment.

Another key take-away is that using the new architecture disclosed herein, one enhanced data agent 242 can support a number of distinct primary applications 110 on one or more computing platforms, e.g., 202. This solution greatly reduces the footprint and installation/management effort associated with more traditional data agents, which are individually paired with a target application and separately with its file system. Instead, according to the illustrative embodiments, a substantial number of primary applications 110 can be protected by one enhanced data agent 242 and by limited-footprint components (if any) on the primary computing platform, such as installed application utilities 570, 670 and/or installed application-specific block change filters 440, 540. In many systems enhanced data agent 242 may co-reside with a media agent 144/244 on a secondary storage computing device 206, which means that the enhanced data agent 242 does not require additional specialized computing hardware.

Figure 8A:
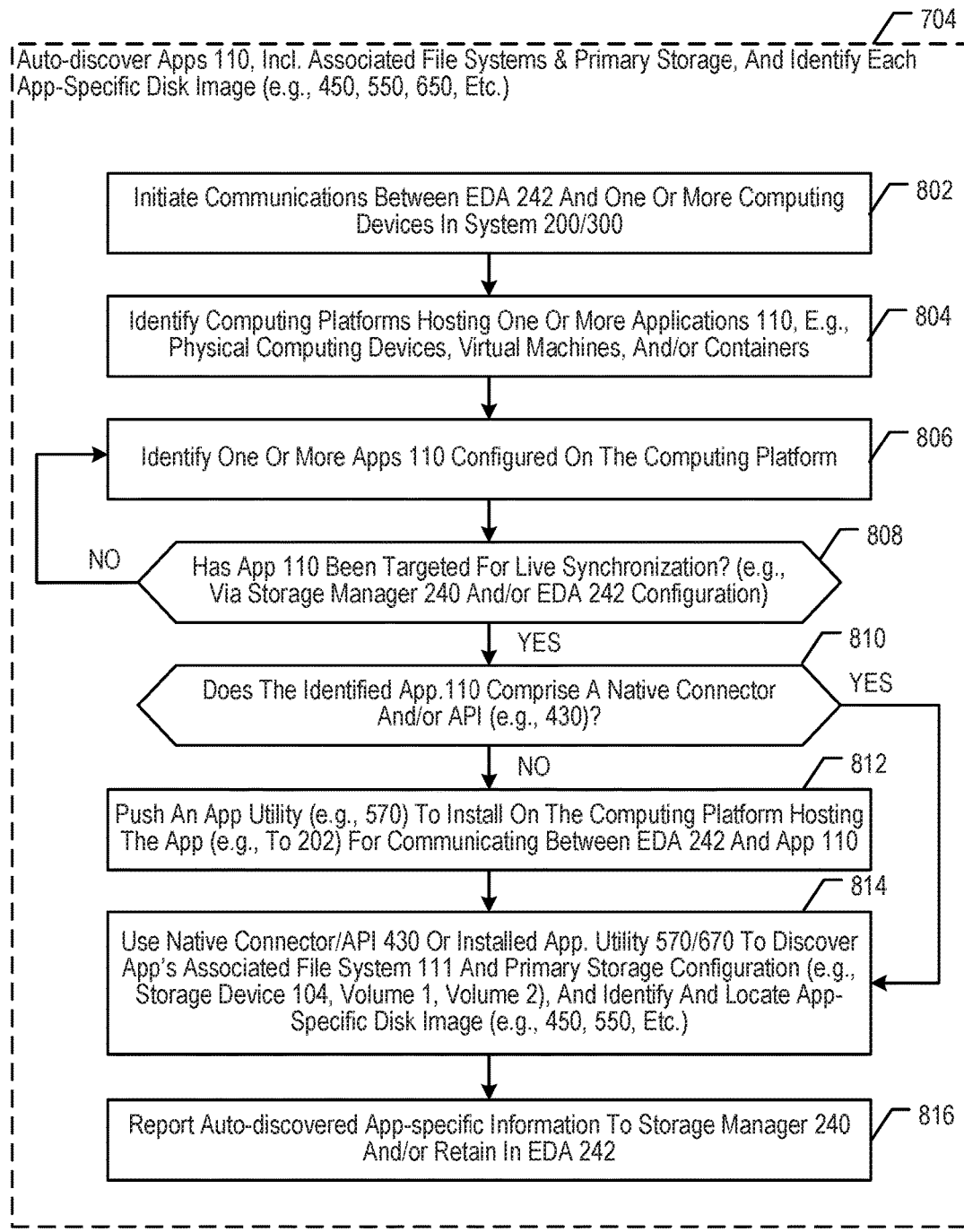
FIG. 8A depicts some salient sub-operations of block 704 in method 700.

FIG. 8A depicts some salient sub-operations of block 704 in method 700. Block 704 is generally directed at auto-discovering primary applications 110, including their associated file systems and primary storage, and identifying each application-specific disk image (e.g., 450, 550, 650, etc.) in primary storage.

At block 802, enhanced data agent 242 initiates communications with one or more computing devices in system 200/300, e.g., based on network configuration information available from storage manager 240.

At block 804, enhanced data agent 242 identifies computing platforms hosting one or more applications 110, e.g., physical computing devices, virtual machines, and/or Containers At block 806, enhanced data agent 242 identifies one or more primary applications 110 configured on the respective computing platform.

At block 808, which is a decision point, enhanced data agent 242 determines whether a given identified primary application 110 has been targeted for Live Synchronization? (e.g., via storage manager 240 and/or EDA 242 configuration). If not, the present primary application 110 will not be Live Synched and control passes back to block 806 to identify other primary application 110. If yes, control passes to block 810.

At block 810, which is a decision point, enhanced data agent 242 determines whether the identified primary application 110 comprises a native connector and/or API (e.g., 430). The determination is based on native intelligence built into enhanced data agent 242 and/or by querying storage manager 240. If yes, control passes to block 814, otherwise control passes to block 812.

At block 812, enhanced data agent 242 pushes a functional module designated an "application utility" (e.g., 570, 670) to the computing platform hosting the primary application 110 to be installed thereon (e.g., on host 202) for communicating between EDA 242 and application 110.

At block 814, enhanced data agent 242 uses a native connector/API 430 or installed application utility 570/670 to discover the primary application's associated file system 111 and primary storage configuration (e.g., storage device 104, volume 1, volume 2), and identify and locate the application-specific disk image (e.g., 450, 550, etc.).

At block 816, enhanced data agent 242 reports the auto-discovered application-specific information (from the preceding block) to storage manager 240 and/or retains the information in EDA 242.

Figure 8B:
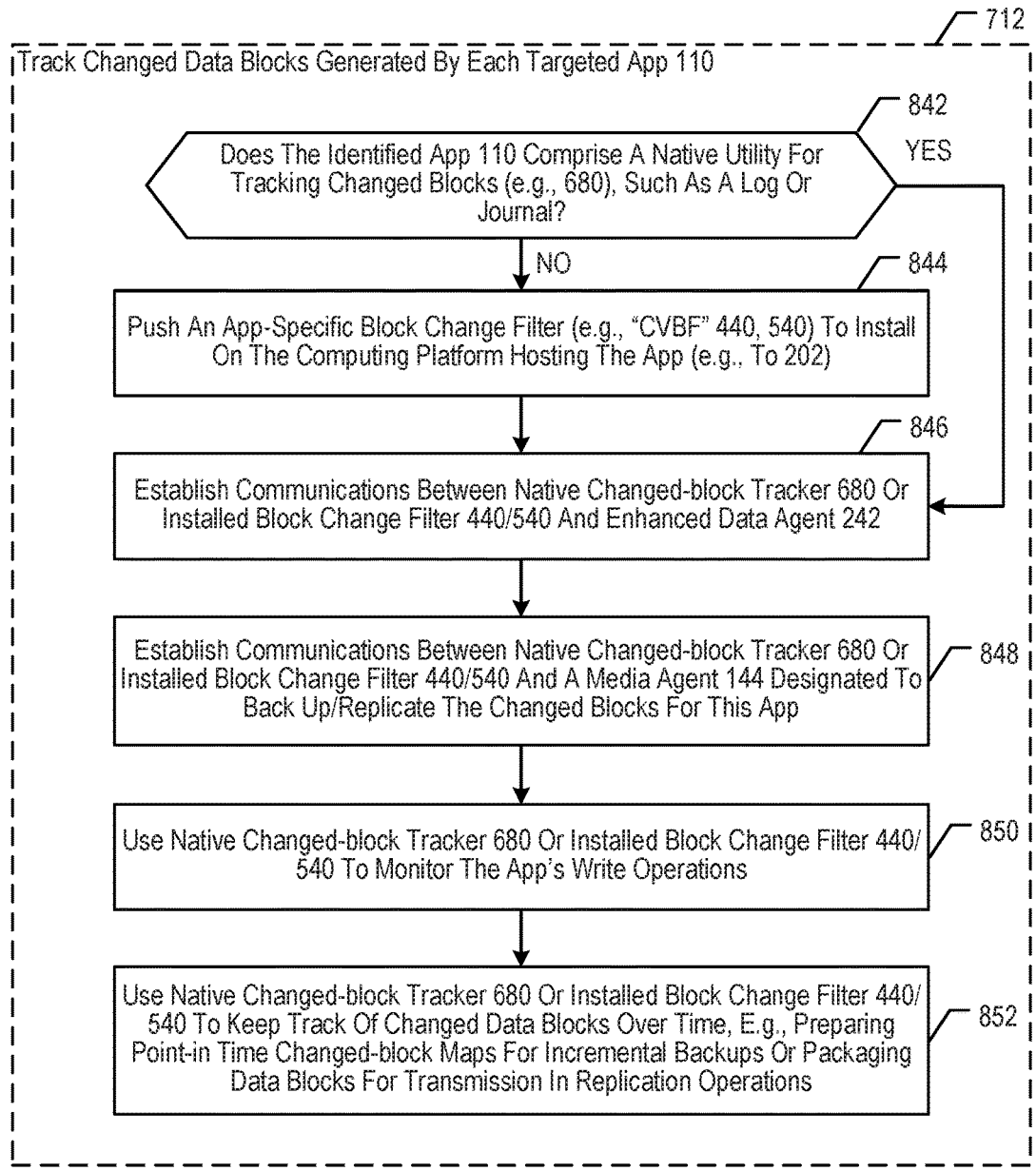
FIG. 8B depicts some salient sub-operations of block 712 in method 700.

FIG. 8B depicts some salient sub-operations of block 712 in method 700. Block 712 is generally directed at tracking changed data blocks generated by each application 110 targeted for Live Synchronization.

At block 842, which is a decision point, enhanced data agent 242 determines whether the identified application 110 comprises a native utility for tracking changed blocks (e.g., 680), such as a log or journal or like functionality. This determination is based on intelligence available in enhanced data agent 242. If yes, control passes to block 846, otherwise control passes to block 844.

At block 844, enhanced data agent 242 pushes an application-specific (specific to the targeted application 110) block change filter (e.g., 440, 540) to be installed and activated on the computing platform hosting the primary application (e.g., to 202).

At block 846, enhanced data agent 242 establishes communications with the installed block change filter 440/540 (from the preceding block) or with a native changed-block tracker 680 that is available in the targeted application 110 or its associated file system 111.

At block 848, communications are (optionally) established between a media agent 144 designated to back up/replicate the changed blocks for the present primary application 110 and the native changed-block tracker 680 or installed block change filter 440/540. This communication path is not required in all embodiments.

At block 850, the native changed-block tracker 680 or installed block change filter 440/540 monitors the primary application's write operations.

At block 852, the native changed-block tracker 680 or installed block change filter 440/540 keeps track of changed data blocks over time, e.g., preparing point-in time changed-block maps for creating incremental backups and recovery points and/or packaging data blocks for transmission in replication operations. The changed data blocks are or will be transmitted to enhanced data agent 242, ultimately resulting in incremental backups stored at intermediary secondary storage 108 or else being continuously replicated to the standby/failover copy of the disk image.

Figure 9A:
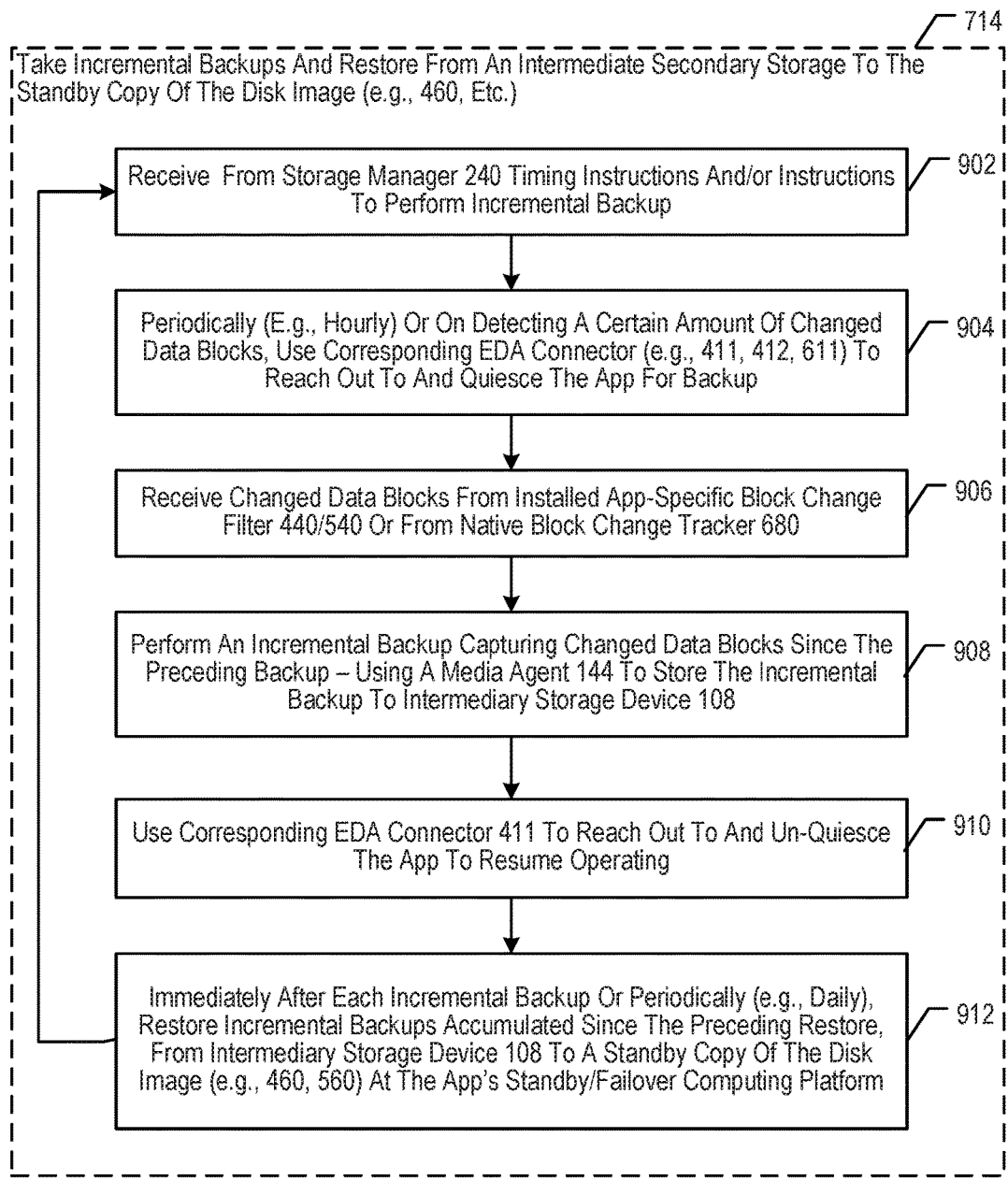
FIG. 9A depicts some salient sub-operations of block 714 in method 700.

FIG. 9A depicts some salient sub-operations of block 714 in method 700. Block 714 is generally directed at taking incremental backups and restoring them from an intermediate secondary storage to the standby copy of the disk image (e.g., 460, etc.)

At block 902, enhanced data agent 242 receives from storage manager 240 timing instructions and/or instructions to perform an incremental backup of targeted primary application 110, i.e., its disk image, e.g., 450.

At block 904, enhanced data agent 242 periodically (e.g., hourly) or on detecting a certain amount of changed data blocks, uses the corresponding connector for the targeted application (e.g., 411, 412, 611) to reach out to and quiesce the application 110 for backup.

At block 906, enhanced data agent 242 receives changed data blocks (or pointers thereto or other indicators of changed data blocks) from installed application-specific block change filter 440/540 or from native block change tracker 680.

At block 908, enhanced data agent 242 performs an incremental backup capturing changed data blocks since the preceding backup—using a media agent 144 assigned to store the incremental backup to intermediary storage device 108. This incremental backup may be designated a point-in-time recovery point to be used for restoring the primary application 110 or the synchronized application 110S to an earlier known good point-in-time if need be.

At block 910, enhanced data agent 242 uses the corresponding connector for the targeted application (e.g., 411, 412, 611) to reach out to and un-quiesce the primary application 110 so that it may resume normal operations.

At block 912, immediately after each incremental backup or periodically (e.g., daily), enhanced data agent 242 restore the incremental backups accumulated since the preceding restore, from intermediary storage device 108 to a standby copy of the disk image (e.g., 460, 560) at the standby/failover computing platform. Control passes back to block 902 for receiving further instructions, if any, from storage manager 240.

Figure 9B:
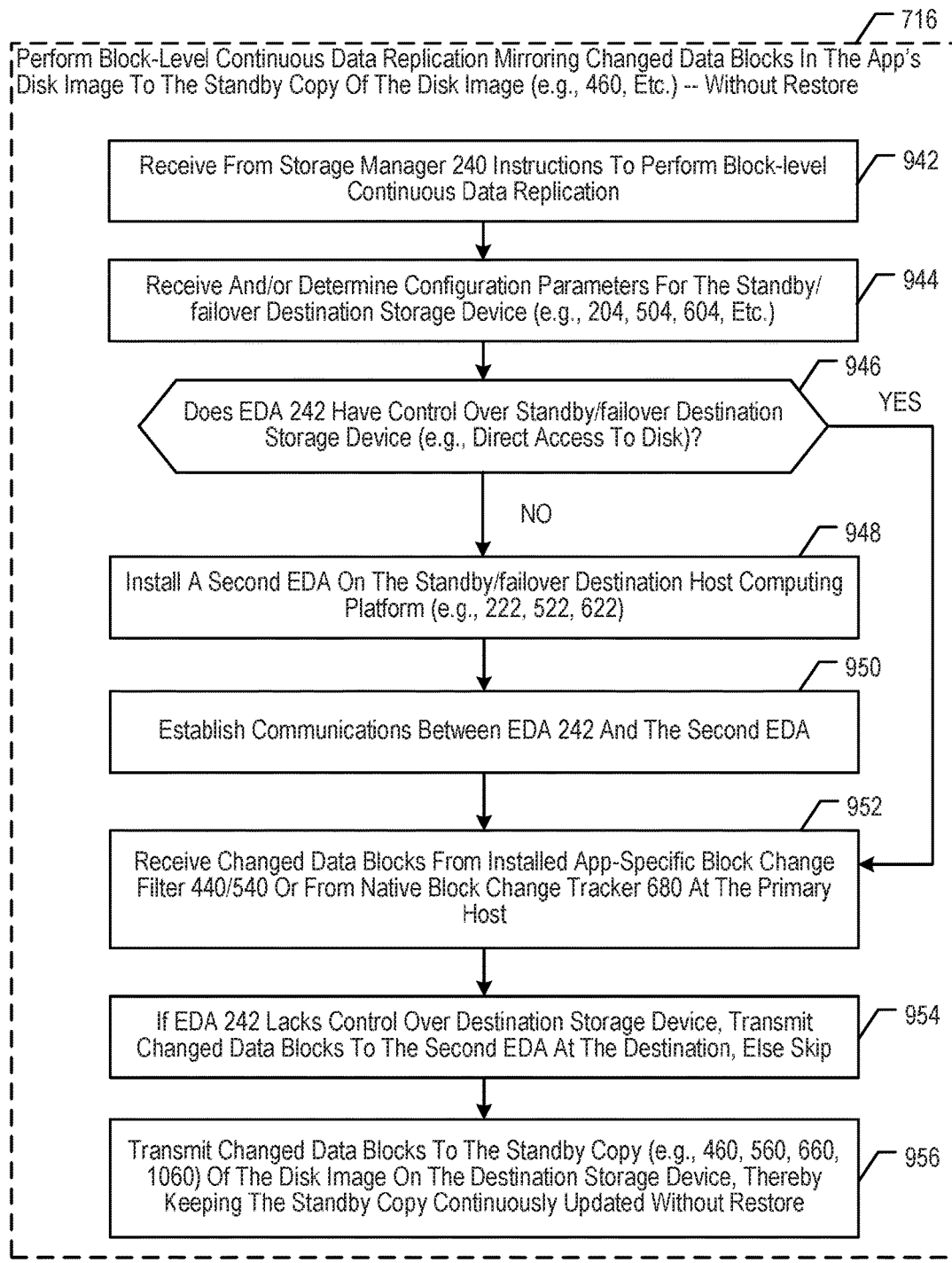
FIG. 9B depicts some salient sub-operations of block 716 in method 700.

FIG. 9B depicts some salient sub-operations of block 716 in method 700. The present block is generally directed at performing block-level continuous data replication, which mirrors changed data blocks in the primary application's disk image to the standby copy of the disk image (e.g., 460, etc.)—without the need to restore from a backup copy.

At block 942, enhanced data agent 242 receives from storage manager 240 instructions to perform block-level continuous data replication for the targeted application 110.

At block 944, enhanced data agent 242 receives from storage manager 240 and/or determines via its own resources one or more configuration parameters for the standby/failover destination storage device (e.g., 204, 504, 604, etc.) that is to store the standby copy of the disk image.

At block 946, which is a decision point, enhanced data agent 242 determines whether it has control over the standby/failover destination storage device (e.g., direct access to disk). If yes, control passes to block 952, otherwise control passes to block 948.

At block 948, a second EDA (not shown in the present figures) is installed on the standby/failover destination host computing platform (e.g., 222, 522, 622, 1022, etc.). This second EDA is installed at the destination host by storage manager 240, e.g., pushing the executable software to the destination host. Alternatively, EDA 242 causes the install to happen, e.g., pushing the executable software to the destination host.

At block 950, enhanced data agent 242 establishes communications between EDA 242 and the second EDA. This second EDA will act as an intermediary routing point for changed data blocks from EDA 242 that are destined for the standby copy in the destination storage device. The second EDA acts as a portal for accessing the standby/failover storage device and writing changed blocks thereto.

At block 952, which may follow after block 946 or 950, enhanced data agent 242 receives changed data blocks from the primary host, e.g., from installed application-specific block change filter 440/540 or from native block change tracker 680 at the primary host. The respective block tracker/filter monitors write operations performed by the targeted application 110 and detects changed blocks as they are written. The changed blocks are transmitted to EDA 242 on an ongoing basis; in some embodiments, the changed blocks are transmitted in closely spaced intervals that are effectively continuous.

At block 954, which is only performed in configurations where enhanced data agent 242 lacks control over the destination storage device, i.e., when a second EDA is operating at the standby/failover host, EDA 242 transmits the changed data blocks to the second EDA at the destination.

At block 956, the changed data blocks are transmitted to the standby copy (e.g., 460, 560, 660, and 1060) of the disk image on the destination storage device, thereby keeping the standby copy continuously updated without restoring from a backup copy. If a second EDA is operating at the standby/failover host, the changed data blocks are transmitted to and the updating of the standby copy is performed by the second EDA, using changed data blocks received from EDA 242. If EDA 242 has control over the standby/failover storage device (e.g., direct access to the disk), the changed data blocks are transmitted to and the updating of the standby copy is performed by the EDA 242, using changed data blocks received from the primary host.

FIG. 10 is a block diagram illustrating some salient portions of system 200 or 300 for application-level Live Synchronization depicting Live Synchronization of co-resident applications to disparate standby destinations and further depicting selectively synchronizing some applications and not others among the co-resident applications. Co-resident applications can be separately Live Synched as needed independently of each other, such that co-resident primary applications 110-1 and 110-$k$ are dispersed to different and distinct standby/failover destinations 222 and 1022 respectively. Vice-versa, previously separated applications can be Live Synchronized to the same standby/failover destination (not shown). Furthermore, in the present figure, application 110-2 is not selected for Live Synchronization at all, although it may be backed up and protected in traditional ways.

Importantly, the illustrative systems can support cross-platform Live Synchronization, such that the source/host and destination/standby computing platforms can be of different types and technologies, e.g., from physical server to virtual machine and vice-versa, from one type of virtualized environment to another, from one type of container to another, etc.

In some embodiments, "Application-Specific Live Sync" further includes one or more of the features below, without limitation:

Auto/Manual failover. Manual failover: administrators can schedule failover of selected primary applications 110. This type of failover performs the latest incremental backup and/or replicates the latest changes to the standby/failover site and performs application shutdown on the source and activates the synchronized application 110S. Auto failover: Failover will be initiated automatically when the primary site is dead due to disaster or outage. This approach activates the failover site and synchronized application 110S and disables further backups of primary application 110 and breaks replication from source to destination. In both scenarios, the system thereafter operates the failover computing environment as the production environment until such time as the original production environment can be re-activated and appropriately restored.

Test failover of selected synchronized application 110S. This failover mode is used to validate the replication at the failover site without switching the production environment away from the primary. This failover type makes sure the synchronized (failover) applications 110S boot up successfully and can execute certain given scripts that execute on the primary application 110. The test results may be reported to storage manager 240, a system console, or another reporting platform.

Failover synchronized application boot sequence and grouping. Administrators may set the boot order for synchronized applications 110S to come online. Application dependencies may be handled this way, so that a dependent application 110S will boot up after another synchronized application 110S boots up first.

Reverse sync and data protection configuration from standby to primary (production). After Manual\Auto failover of applications from primary (source production environment) to a standby/failover site, the failover can be the production site for a temporary time period or for any duration. In that situation, the illustrative system can protect the data of the failover platform as this is the new production site, and replicate data back to the primary site. This feature automatically configures reverse replication and data protection schedules.

Failback. After Manual\Auto failover as described above, this feature helps to fail back to primary from the failover environment. This provides options to keep the primary environment as it was originally, or perhaps use different storage, different server, etc.

Replication (block-level continuous data replication) to and from cloud sites as the standby/failover destination. Replication of applications to cloud platforms is automated, e.g., to Azure, Amazon, VMWare vCloud, etc., without limitation, and vice versa.

Multiple standby/failover sites for one primary application. In some configurations, a given primary application 110 may be synchronized to not just one, but to multiple standby/failover destinations, any one of which can take over in case the primary application 110 fails.

The preceding paragraphs provide a number of illustrative scenarios, which may operate in various combinations and permutations with each other, without limitation.

In regard to the figures described herein, other embodiments are possible within the scope of the present invention, such that the above-recited components, steps, blocks, operations, and/or messages/requests/queries/instructions are differently arranged, sequenced, sub-divided, organized, and/or combined. In some embodiments, a different component may initiate or execute a given operation and/or a different component may query, direct, or instruct another component to perform some of the recited functionality. Some of the functional modules (e.g., 410, 411, 412, 420, 620, etc.) are shown herein as a distinct sub-component to ease understanding of the present disclosure, however, alternative embodiments are also possible within the scope of the present invention wherein the disclosed functional module is layered on existing code, combined with other functional modules, and/or only exists as a logical construct whose functionality is distributed through one or more other functional modules of the parent component, e.g., enhanced data agent 242. Likewise, native functionality depicted as modules 430 and 680 may be implemented differently within the respective primary application 110 and/or file system 111 than as depicted in the figures herein.

Example Embodiments

Some example enumerated embodiments of the present invention are recited in this section without limitation.

According to an illustrative embodiment, a method comprising: synchronizing a first application represented in a first disk image that stores the first application's primary data to a standby version of the first application, wherein the first application executes on a first computing platform in communication with the first disk image, which is stored in a first data storage device, wherein the first disk image represents the first application and not a second application that also executes on the first computing platform, and wherein the standby version of the first application comprises a copy of the first disk image which is stored in a second storage device associated with a second computing platform that hosts the standby version of the first application. The above-recited method wherein the synchronizing comprises continuously replicating changed data blocks from the first disk image to the copy of the first disk image. The above-recited method wherein the copy of the first disk image is continuously replicated from changed data blocks at the first disk image after an initial full backup of the first disk image. The above-recited method further comprising: booting up the standby version of the first application from the copy of the first disk image; and executing the standby version of the first application on the second computing platform, based on the copy of the first disk image. The above-recited method further comprising: on detecting a failure of the first application, booting up the standby version of the first application from the copy of the first disk image; and executing the standby version of the first application on the second computing platform, based on the copy of the first disk image, wherein the standby version of the first application executes instead of the first application. The above-recited method wherein after an initial full backup of the first disk image, the copy of the first disk image is repeatedly restored from incremental backups taken of the first disk image which incremental backups comprise changed data blocks copied from changes at the first disk image. The above-recited method wherein the first application is selected for synchronization and further wherein the second application that also executes on the first computing platform is not selected for synchronization to a corresponding standby version, thereby selectively synchronizing some applications on the first computing platform and NOT other applications on the same first computing platform.

The above-recited method wherein only a portion of the first disk image is selected for synchronization such that the second copy of the first disk image represents only the selected portion of the first disk image, and wherein the selected portion is one of: a logical volume, a physical disk, a file, and a folder. The above-recited method wherein the first computing platform is a physical computing device and wherein the second computing platform is a virtual machine. The above-recited method wherein the first computing platform is a virtual machine and wherein the second computing platform is a physical computing device. The above-recited method wherein the first computing platform is a first type of virtual machine and wherein the second computing platform is second type of virtual machine which is different from the first type of virtual machine. The above-recited method wherein the synchronizing comprises: automatically discovering, by a data agent operating on a third computing platform that is distinct from the first computing platform and the second computing platform, operational characteristics of the first application, including identifying and locating the first disk image. The above-recited method wherein the synchronizing comprises: causing to be installed on the first computing platform, by a data agent operating on a third computing platform that is distinct from the first computing platform and the second computing platform, an application-utility; causing the application-utility to establish communications with the first application and with the data agent; and automatically discovering by the data agent, via the application-utility, operational characteristics of the first application, including identifying and locating the first disk image. The above-recited method wherein the synchronizing comprises: causing to be installed on the first computing platform, by a data agent operating on a third computing platform that is distinct from the first computing platform and the second computing platform, a changed-block filter; causing the changed-block filter intercept and transmit to the data agent changed data blocks in the first disk image resulting from write operations performed by the first application; and using the changed data blocks received from the changed-block filter to (a) repeatedly generate incremental backup copies of the first disk image, or (b) provide continuous data replication of the changed data blocks to the standby copy of the first disk image. The above-recited method further comprising: identifying a second application that also executes on the first computing platform, wherein the second application is represented in a second disk image that stores the second application's primary data, and wherein the second disk image represents the second application and only the second application. The above-recited method further comprising: synchronizing the second application to a standby version of the second application, wherein the standby version of the second application comprises a copy of the second disk image which is restored to a third storage device associated with a third computing platform that hosts the standby version of the second application, and wherein the third computing platform is distinct from the second computing platform that hosts the standby version of the first application. The above-recited method further comprising: on detecting a failure of the second application, booting up the standby version of the second application from the copy of the second disk image to execute in place of the first application, wherein the standby version of the second application executes on the third computing platform; and thereby synchronizing co-resident applications to disparate standby destinations. The above-recited method wherein the first application is protected separately from any other application that also executes on the same virtual machine as the first application. The above-recited method wherein the first application and one or more second applications execute on a first virtual machine; and wherein the first application is protected separately from the one or more second applications.

According to another illustrative embodiment, a method comprising: synchronizing a first application represented in a first disk image that stores the first application's primary data to a standby version of the first application, wherein the first application executes on a first computing platform in communication with the first disk image, which is stored in a first data storage device, wherein the first disk image represents the first application and not a second application that also executes on the first computing platform, and wherein the standby version of the first application comprises a copy of the first disk image which is stored in a second storage device associated with a second computing platform that hosts the standby version of the first application; and wherein after an initial full backup of the first disk image, the copy of the first disk image is repeatedly restored from incremental backups taken of the first disk image which incremental backups comprise changed data blocks copied from changes at the first disk image. The above-recited method wherein the first application is protected separately from any other application that also executes on the same virtual machine as the first application. The above-recited method wherein the first application and one or more second applications execute on a first virtual machine; and wherein the first application is protected separately from the one or more second applications.

Another illustrative embodiment comprises a computer-readable medium, excluding transitory propagating signals, storing instructions that, when executed by at least one secondary storage computing device, cause the secondary storage computing device to perform operations comprising: automatically discovering operational characteristics of a first application, including identifying and locating a first disk image that stores the first application's primary data and represents the first application, wherein the first application executes on a first computing platform in communication with the first disk image, and wherein the first computing platform is distinct from and in communication with the secondary storage computing device. The above-recited computer-readable medium further comprising: synchronizing the first application represented in the first disk image to a standby version of the first application. The above-recited computer-readable medium wherein the standby version of the first application comprises a copy of the first disk image which is stored in a second storage device associated with a second computing platform that hosts the standby version of the first application, and wherein the second computing platform is distinct from the first computing platform hosting the first application and is also distinct from the secondary storage computing device. The above-recited computer-readable medium wherein the operations further comprise: on detecting a failure of the first application, causing the standby version of the first application (a) to boot up from the copy of the first disk image, and (b) to execute instead of the first application, wherein the standby version of the first application executes on the second computing platform.

The above-recited computer-readable medium wherein the copy of the first disk image is continuously replicated from changed data blocks at the first disk image after an initial full backup of the first disk image. The above-recited computer-readable medium wherein after an initial full backup of the first disk image, the copy of the first disk image is repeatedly restored from incremental backups taken of the first disk image which incremental backups comprise changed data blocks copied from changes at the first disk image.

According to another illustrative embodiment, a computer-readable medium, excluding transitory propagating signals, storing instructions that, when executed by at least one computing device in a storage management system, cause the at least one computing device to perform operations comprising: synchronizing a first application represented in a first disk image that stores the first application's primary data to a standby version of the first application. The above-recited computer-readable medium wherein the first application executes on a first computing platform in communication with the first disk image. The above-recited computer-readable medium wherein the first disk image represents the first application. The above-recited computer-readable medium wherein the standby version of the first application comprises a copy of the first disk image which is stored in a second storage device associated with a second computing platform that hosts the standby version of the first application. The above-recited computer-readable medium further comprising: booting up the standby version of the first application from the copy of the first disk image. The above-recited computer-readable medium further comprising: executing the standby version of the first application on the second computing platform, based on the copy of the first disk image.

In another embodiment, a system for synchronizing a first application on a first computing platform to a standby version of the application on a second computing platform, may comprise: a first computing platform comprising one or more first computing devices, wherein one of the one or more first computing devices hosts the first application; a first data storage device, in communication with the first computing platform, wherein the first data storage device comprises a first disk image that represents the first application and comprises the first application's primary data; a second computing platform comprising one or more second computing devices, distinct from the first computing devices, wherein one of the one or more second computing devices hosts a standby version of the first application; a second data storage device, in communication with the second computing platform, wherein the second data storage device comprises a copy of the first disk image; and a third computing device that hosts a data agent for continuously replicating changed data blocks from the first disk image to the copy of the first disk image, thereby synchronizing the first application to the standby version of the application.

The above-recited system further comprising a fourth computing device that hosts a storage manager for managing storage operations in the system, including managing of the continuously replicating changed data blocks; and wherein the data agent is configured to discover the first application in response to a query received from the storage manager. The above-recited system wherein the data agent is configured to quiesce the first application before performing a backup of the first disk image. The above-recited system wherein the data agent is configured to: quiesce the first application, and participate in generating a backup copy of the first disk image. The above-recited system wherein the data agent is configured to: quiesce the first application, participate in generating a backup copy of the first disk image, and participate in restoring the backup copy of the first disk image as an initial version of the copy of the first disk image stored in the second data storage device. The above-recited system wherein the standby version of the first application is configured to execute based on the copy of the first disk image stored in the second data storage device.

In yet another embodiment, a system for synchronizing a first application on a first computing platform to a standby version of the application on a second computing platform may comprise: a first computing platform comprising one or more first computing devices, wherein one of the one or more first computing devices hosts the first application; a first data storage device, in communication with the first computing platform, wherein the first data storage device comprises a first disk image that represents the first application and comprises the first application's primary data; a second computing platform comprising one or more second computing devices, distinct from the first computing devices, wherein one of the one or more second computing devices hosts a standby version of the first application; a second data storage device, in communication with the second computing platform, wherein the second data storage device comprises a copy of the first disk image; and a third computing device that hosts a data agent for periodically generating a backup copy of the first disk image, and further for restoring the respective backup copy of the first disk image to the copy of the first disk image stored in the second data storage device, thereby synchronizing the first application to the standby version of the application.

The above-recited system wherein the data agent is configured to discover one or more operational characteristics of the first application. The above-recited system wherein the data agent is configured to discover one or more operational characteristics of the first application, including identifying and locating the first disk image. The above-recited system further comprising a fourth computing device that hosts a storage manager for managing storage operations in the system, including managing the generating and restoring operations; and wherein the data agent is configured to discover one or more operational characteristics of the first application in response to a query received from the storage manager. The above-recited system wherein the data agent is configured to quiesce the first application before generating the backup copy of the first disk image. The above-recited system wherein the data agent is configured to: quiesce the first application, and participate in the generating of the backup copy of the first disk image in conjunction with a media agent that also executes on the third computing device. The above-recited system wherein the data agent is configured to: quiesce the first application, participate in the generating of the backup copy of the first disk image in conjunction with a media agent that also executes on the third computing device, and participate in the restoring of the backup copy of the first disk image in conjunction with the media agent. The above-recited system wherein the standby version of the first application is configured to execute based on the copy of the first disk image stored in the second data storage device.

In another illustrative embodiment, a data agent executing on a first computing platform for application synchronization executes a method comprising: initiating communications between the data agent and one or computing devices distinct from the first computing platform; identifying one or more second computing platforms that respectively host one or more applications, wherein a second computing platform comprises one of: a physical computing device, a virtual machine, and a software container; identifying a first of the one or more applications; if the first application has not been targeted for synchronization, identifying a second of the one or more applications; if the first application has been targeted for synchronization, determining whether the first application comprises a native connector and/or application programming interface; if the first application does not comprise the native connector and/or application programming interface, pushing an application-utility to the second computing platform that hosts the first application; communicating with one of: the native connector, application programming interface, and application-utility available on the second computing platform that hosts the first application, to discover the first application's associated file system and primary storage configuration and to identify and locate the first application's disk image; and reporting the discovered, identified, and located information to a storage manager.

In another illustrative embodiment, a changed-block tracker executing on a first computing device that also hosts a first application targeted for synchronization executes a method comprising: establishing communications between the changed-block tracker and a data agent that executes on a second computing device; establishing communications between the changed-block tracker and a media agent that also executes on the second computing device; monitoring the first application's write operations to identify changed data blocks in a first disk image of the first application stored in a first data storage device accessible to the first application; and tracking the identified changed data blocks. The above-recited method wherein the changed-block tracker uses the identified changed data blocks to generate successive point-in-time changed-block maps for incremental backup copies of the first disk image. The above-recited method wherein the changed-block tracker transmits the identified changed data blocks to a copy of the first disk image on a second data storage device.

In yet another example embodiment, a data agent executing on a first computing platform for application synchronization executes a method comprising: receiving from a storage manager instructions to perform an incremental backup; periodically or on detecting that a number of changed data blocks exceeds a threshold, quiescing a first application that executes on a first computing device that is distinct from the first computing platform; receiving a set of changed data blocks from a changed-block tracker on the first computing device; performing an incremental backup that captures the set of changed data blocks since a preceding backup operation, wherein a media agent stores the set of changed data blocks to an intermediary data storage device; un-quiescing the first application; and restoring the set of changed data blocks from the intermediary data storage device to a standby copy of the first application on a second computing device configured as a standby destination for the first application.

In another illustrative embodiment, a data agent executing on a first computing platform for application synchronization executes a method comprising: receiving instructions from a storage manager to perform block-level continuous data replication for a first disk image that represents a first application and comprises the first application's primary data; receiving changed data blocks from a changed-block tracker co-resident with the first application; and applying the changed data blocks to a standby copy of the first disk image, thereby keeping the standby copy continuously synchronized with the first disk image without using a restore operation for keeping the standby copy continuously synchronized with the first disk image.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs. In yet other embodiments, system, methods, and/or computer-readable media may operate according to the systems and flowcharts depicted in FIGS. 2-10 and according to the accompanying paragraphs, whether taken in whole or in part, and in any combination thereof, without limitation.

Terminology

Conditional Language, Such as, Among Others, "can," "could," "Might," or "May," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method comprising:
   synchronizing a first application, which is represented in a first disk image that stores the first application's primary data, to a standby version of the first application,
      wherein the first application executes on a first computing platform in communication with the first disk image, which is stored in a first data storage device,
      wherein the first disk image represents the first application and not a second application that also executes on the first computing platform, and
      wherein the standby version of the first application comprises a copy of the first disk image which is stored in a second storage device associated with a second computing platform that hosts the standby version of the first application;
   automatically discovering, by a data agent operating on a third computing platform that is distinct from the first computing platform and the second computing platform, operational characteristics of the first application, including identifying and locating the first disk image; and
   wherein the synchronizing comprises continuously replicating changed data blocks from the first disk image to the copy of the first disk image.

2. The method of claim 1, wherein the copy of the first disk image is continuously replicated from changed data blocks at the first disk image after an initial backup of the first disk image.

3. The method of claim 1 further comprising:
   booting up the standby version of the first application from the copy of the first disk image; and
   executing the standby version of the first application on the second computing platform, based on the copy of the first disk image.

4. The method of claim 1 further comprising:
   on detecting a failure of the first application, booting up the standby version of the first application from the copy of the first disk image; and
   executing the standby version of the first application on the second computing platform, based on the copy of the first disk image, wherein the standby version of the first application executes instead of the first application.

5. The method of claim 1, wherein after an initial backup of the first disk image, the copy of the first disk image is repeatedly restored from incremental backups taken of the first disk image which incremental backups comprise changed data blocks copied from changes at the first disk image.

6. The method of claim 1, wherein the first application is selected for synchronization and further wherein the second application that also executes on the first computing platform is not selected for synchronization to a corresponding standby version,
   thereby selectively synchronizing some applications on the first computing platform and not other applications on the same first computing platform.

7. The method of claim 1, wherein only a portion of the first disk image is selected for synchronization such that the first copy of the first disk image represents only the selected portion of the first disk image, and wherein the selected portion is one of: a logical volume, a physical disk, a file, and a folder.

8. The method of claim 1, wherein the first computing platform is a physical computing device and wherein the second computing platform is a virtual machine.

9. The method of claim 1, wherein the first computing platform is a virtual machine and wherein the second computing platform is a physical computing device.

10. The method of claim 1, wherein the first computing platform is a first type of virtual machine and wherein the second computing platform is a second type of virtual machine which is different from the first type of virtual machine.

11. The method of claim 1 further comprising:
    identifying a second application that also executes on the first computing platform,
       wherein the second application is represented in a second disk image that stores the second application's primary data, and
       wherein the second disk image represents the second application and only the second application;
    synchronizing the second application to a standby version of the second application,
       wherein the standby version of the second application comprises a copy of the second disk image which is restored to a third storage device associated with a third computing platform that hosts the standby version of the second application, and
       wherein the third computing platform is distinct from the second computing platform that hosts the standby version of the first application;
    on detecting a failure of the second application, booting up the standby version of the second application from the copy of the second disk image to execute in place of the first application,
       wherein the standby version of the second application executes on the third computing platform;

thereby synchronizing co-resident applications to disparate standby destinations.

12. A method comprising:
    synchronizing a first application, which is represented in a first disk image that stores the first application's primary data, to a standby version of the first application,
        wherein the first application executes on a first computing platform in communication with the first disk image, which is stored in a first data storage device,
        wherein the first disk image represents the first application and not a second application that also executes on the first computing platform, and
        wherein the standby version of the first application comprises a copy of the first disk image which is stored in a second storage device associated with a second computing platform that hosts the standby version of the first application;
    causing to be installed on the first computing platform, by a data agent operating on a third computing platform that is distinct from the first computing platform and the second computing platform, an application-utility;
    causing the application-utility to establish communications with the first application and with the data agent;
    automatically discovering by the data agent, via the application-utility, operational characteristics of the first application, including identifying and locating the first disk image; and
    wherein the synchronizing comprises continuously replicating changed data blocks from the first disk image to the copy of the first disk image.

13. The method of claim 12, wherein the copy of the first disk image is continuously replicated from changed data blocks at the first disk image after an initial backup of the first disk image.

14. The method of claim 12 further comprising:
    booting up the standby version of the first application from the copy of the first disk image; and
    executing the standby version of the first application on the second computing platform, based on the copy of the first disk image.

15. The method of claim 12, further comprising:
    on detecting a failure of the first application, booting up the standby version of the first application from the copy of the first disk image; and
    executing the standby version of the first application on the second computing platform, based on the copy of the first disk image, wherein the standby version of the first application executes instead of the first application.

16. The method of claim 12, wherein after an initial backup of the first disk image, the copy of the first disk image is repeatedly restored from incremental backups taken of the first disk image which incremental backups comprise changed data blocks copied from changes at the first disk image.

17. A method comprising:
    synchronizing a first application, which is represented in a first disk image that stores the first application's primary data, to a standby version of the first application,
        wherein the first application executes on a first computing platform in communication with the first disk image, which is stored in a first data storage device,
        wherein the first disk image represents the first application and not a second application that also executes on the first computing platform, and
        wherein the standby version of the first application comprises a copy of the first disk image which is stored in a second storage device associated with a second computing platform that hosts the standby version of the first application; and
    causing to be installed on the first computing platform, by a data agent operating on a third computing platform that is distinct from the first computing platform and the second computing platform, a changed-block filter;
    causing the changed-block filter to intercept and to transmit to the data agent changed data blocks in the first disk image resulting from write operations performed by the first application;
    using the changed data blocks received from the changed-block filter to (a) repeatedly generate incremental backup copies of the first disk image, or (b) provide continuous data replication of the changed data blocks to the standby copy of the first disk image; and
    wherein the synchronizing comprises continuously replicating changed data blocks from the first disk image to the copy of the first disk image.

18. The method of claim 17, wherein the copy of the first disk image is continuously replicated from changed data blocks at the first disk image after an initial backup of the first disk image; and
    wherein after an initial backup of the first disk image, the copy of the first disk image is repeatedly restored from incremental backups taken of the first disk image which incremental backups comprise changed data blocks copied from changes at the first disk image.

19. The method of claim 17, further comprising:
    booting up the standby version of the first application from the copy of the first disk image; and
    executing the standby version of the first application on the second computing platform, based on the copy of the first disk image.

20. The method of claim 17, further comprising:
    on detecting a failure of the first application, booting up the standby version of the first application from the copy of the first disk image; and
    executing the standby version of the first application on the second computing platform, based on the copy of the first disk image, wherein the standby version of the first application executes instead of the first application.

* * * * *